United States Patent
John Wilson et al.

(10) Patent No.: US 11,722,351 B2
(45) Date of Patent: Aug. 8, 2023

(54) INTERFERENCE MITIGATION FOR FULL-DUPLEX COMMUNICATION

(71) Applicant: QUALCOMM Incorporated, San Diego, CA (US)

(72) Inventors: Makesh Pravin John Wilson, San Diego, CA (US); Jung Ho Ryu, Fort Lee, NJ (US); Tao Luo, San Diego, CA (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 16/729,140

(22) Filed: Dec. 27, 2019

(65) Prior Publication Data

US 2020/0235980 A1    Jul. 23, 2020

Related U.S. Application Data

(60) Provisional application No. 62/793,622, filed on Jan. 17, 2019.

(51) Int. Cl.
  H04L 27/26    (2006.01)
  H04L 5/14    (2006.01)
  H04W 56/00    (2009.01)

(52) U.S. Cl.
  CPC .......... *H04L 27/2665* (2013.01); *H04L 5/143* (2013.01); *H04L 27/2666* (2013.01);
  (Continued)

(58) Field of Classification Search
  CPC .................................................. H04L 27/2665
  See application file for complete search history.

(56) References Cited

U.S. PATENT DOCUMENTS

2008/0227454 A1*  9/2008  Damnjanovic ... H04W 36/0058
                                             455/436
2009/0296609 A1  12/2009  Choi et al.
(Continued)

FOREIGN PATENT DOCUMENTS

CN       1444833 A    9/2003
WO  WO-2018204282 A1  11/2018

OTHER PUBLICATIONS

Huawei., et al., "Discussion on HD-FDD Operation of Low Cost MTC UEs", 3GPP Draft, 3GPP TSG RAN WG1 Meeting #77, R1-141942, 3rd Generation Partnership Project (3GPP), Mobile Competence Centre, 650, Route Des Lucioles, F-06921, Sophia-Antipolis Cedex, France, vol. RAN WG1, No. Seoul, Korea; May 19, 2014-May 23, 2014, May 18, 2014 (May 18, 2014), XP050789062, 5 pages, Retrieved from the Internet: URL: http://www.3gpp.org/ftp/Meetings_3GPP_SYNC/RAN1/RAN1/Docs/ [retrieved on May 18, 2014], Section 4.

(Continued)

*Primary Examiner* — Abdeltif Ajid
(74) *Attorney, Agent, or Firm* — Holland & Hart LLP

(57) ABSTRACT

Methods, systems, and devices for wireless communications are described to enable base station and a user equipment (UE) to mitigate interference when using full-duplex communications. For example, a base station communicating with a UE via full-duplex communications may indicate for the UE to align the time of its uplink transmissions with the time the UE receives downlink transmissions. Additionally or alternatively, the base station may indicate a timing alignment window for the UE, where the window may consist of an allowed time period the UE may use to select a time to begin uplink transmissions. In some examples, the base station may select a cyclic prefix for full-duplex communications, where the cyclic prefix may be longer than a cyclic prefix used for other communications. Further, the (Continued)

base station may select uplink frequency and downlink frequency bands separated by a defined guard band for full-duplex communications.

53 Claims, 20 Drawing Sheets

(52) U.S. Cl.
CPC ...... *H04L 27/2678* (2013.01); *H04L 27/2688* (2013.01); *H04W 56/0045* (2013.01)

(56) References Cited

U.S. PATENT DOCUMENTS

| | | | |
|---|---|---|---|
| 2011/0044188 A1* | 2/2011 | Luo | H04W 56/00 370/252 |
| 2013/0051288 A1 | 2/2013 | Yamada et al. | |
| 2016/0105863 A1* | 4/2016 | Li | H04W 4/70 370/330 |
| 2016/0337107 A1* | 11/2016 | Tabet | H04L 5/16 |
| 2017/0054544 A1 | 2/2017 | Kazmi et al. | |
| 2017/0288759 A1 | 10/2017 | Namgoong et al. | |
| 2018/0048413 A1 | 2/2018 | Liu et al. | |
| 2018/0205533 A1 | 7/2018 | Lee et al. | |
| 2019/0222411 A1* | 7/2019 | Xie | H04L 7/08 |
| 2020/0053712 A1* | 2/2020 | Josan | H04W 72/21 |
| 2020/0187226 A1* | 6/2020 | Choi | H04W 72/569 |

OTHER PUBLICATIONS

International Search Report and Written Opinion—PCT/US2019/068941—ISA/EPO—dated Jun. 17, 2020.
Mediatek Inc: "Discussion on CORESET Configurations", 3GPP Draft, 3GPP TSG RAN WG1 Meeting #90, R1-1713675, CORESET Configurations Final, 3rd Generation Partnership Project (3GPP), Mobile Competence Centre, 650, Route Des Lucioles, F-06921, Sophia-Antipolis Cedex, France, vol. RAN WG1, No. Prague, Czech; Aug. 21, 2017-Aug. 25, 2017, Aug. 20, 2017 (Aug. 20, 2017), XP051316475, 6 pages, Retrieved from the Internet: URL: http://www.3gpp.org/ftp/Meetings_3GPP_SYNC/RAN1/Docs/ [retrieved on Aug. 20, 2017], Section 2.2.
RAN WG1: "Half Duplex FDD Operation in LTE", 3GPP Draft, 3GPP TSG RAN WG4 Meeting #46, R4-080255, 3rd Generation Partnership Project (3GPP), Mobile Competence Centre, 650, Route Des Lucioles, F-06921, Sophia-Antipolis Cedex, France, vol. RAN WG4, No. Sorrento, Italy, Feb. 11, 2008-Feb. 15, 2008, Feb. 5, 2008 (Feb. 5, 2008), XP050178890, 2 pages, [retrieved on Feb. 5, 2008], Section 1.
Samsung: "Beam Management for PDCCH", 3GPP Draft, 3GPP TSG RAN WG1 Meeting #90, R1-1714563, Beam Management PDCCH V1, 3rd Generation Partnership Project (3GPP), Mobile Competence Centre, 650, Route Des Lucioles, F-06921, Sophia-Antipolis Cedex, France, vol. RAN WG1, No. Prague, Czechia, Aug. 21, 2017-Aug. 25, 2017, Aug. 20, 2017 (Aug. 20, 2017), XP051317333, 5 pages, Retrieved from the Internet:URL: http://www.3gpp.org/ftp/Meetings_3GPP_SYNC/RAN1/Docs/ [retrieved on Aug. 20, 2017], Section 3.1, Section 3.3, figures 3, 4.
Partial International Search Report—PCT/US2019/068941—ISA/EPO—dated Mar. 30, 2020.
Taiwan Search Report—TW108148583—TIPO—dated May 1, 2023.

* cited by examiner

INTERFERENCE MITIGATION FOR FULL-DUPLEX COMMUNICATION

CROSS REFERENCE

The present Application for Patent claims the benefit of U.S. Provisional Patent Application No. 62/793,622 by JOHN WILSON et al., entitled "INTERFERENCE MITIGATION FOR FULL-DUPLEX COMMUNICATION," filed Jan. 17, 2019, assigned to the assignee to the assignee hereof, and which is expressly incorporated by reference herein.

BACKGROUND

The following relates generally to wireless communications, and more specifically to interference mitigation for full-duplex communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., a UE and a base station) may participate in a full-duplex communication scheme, where uplink and downlink transmissions may occur simultaneously. Accordingly, a wireless device may both receive and transmit data at the same time, and the overlap from receiving and transmitting data may cause inter-carrier and/or inter-symbol interference.

SUMMARY

The described techniques relate to improved methods, systems, devices, and apparatuses that support interference mitigation for full-duplex communication. Generally, the described techniques provide for enabling a base station and a user equipment (UE) to mitigate interference (e.g., inter-carrier and/or inter-symbol interference as observed by the UE) when communicating using full-duplex transmission time intervals (TTIs). For example, a base station may signal or otherwise configure a UE to adjust an uplink transmission time (e.g., the time at which the UE begins transmitting an uplink frame, subframe, symbol, etc.). In some cases, the base station may indicate for the UE to use a timing alignment for full-duplex transmissions and a different timing advance (TA) for other transmissions (e.g., half-duplex transmissions). For example, the base station may indicate that the UE is to communicate using one or more full-duplex TTIs and that the UE is to align the time of its uplink transmissions with the time the UE receives downlink transmissions (e.g., the time at which a downlink frame, subframe, symbol, etc. arrives at the UE). Additionally or alternatively, the base station may indicate a timing alignment window or offset for the UE, where the window may include an allowed time period from which the UE may select a time to begin uplink transmissions. The window may be defined relative to a time the UE receives a downlink transmission. Further, the base station may set the window based on a cyclic prefix length, based on a time between the TA and a beginning of a downlink reception, or based on a given window of time preceding the downlink reception.

In some examples, the base station may select an adjusted cyclic prefix length for mitigating self-interference in full-duplex communications, and may signal the UE to implement the adjusted cyclic prefix length. For example, the base station may select (e.g., from a set of cyclic prefixes) a cyclic prefix corresponding to full-duplex communications, where the cyclic prefix may be longer than at least one cyclic prefix used for other communications (e.g., half-duplex communications). In some cases, the cyclic prefix for full-duplex communications may be longer than any cyclic prefix used for other communications.

Additionally or alternatively, the base station may select frequency bands for full-duplex communications such that the uplink frequency and downlink frequency bands are separated by a guard band. In some cases, the guard band for full-duplex communications may be larger than some or all guard bands used for other communications. In some examples, the UE may signal the base station indicating a preferred guard band, which the base station may use to select frequency bands. Following the selection, the base station may signal the UE regarding the location of the uplink band for full-duplex TTIs. In some cases, the base station may indicate the uplink frequency band to the UE, or may indicate a location of the downlink frequency band and a guard band such that the UE may determine the location of the uplink frequency band.

A method of wireless communication is described. The method may include receiving an indication that a TTI for an uplink transmission is full-duplex, determining, for the uplink transmission, a transmission time based on the TTI being full-duplex and an arrival time for a downlink transmission of the TTI, and transmitting the uplink transmission based on the transmission time.

An apparatus for wireless communication is described. The apparatus may include a processor, memory coupled with the processor, and instructions stored in the memory. The instructions may be executable by the processor to cause the apparatus to receive an indication that a TTI for an uplink transmission is full-duplex, determine, for the uplink transmission, a transmission time based on the TTI being full-duplex and an arrival time for a downlink transmission of the TTI, and transmit the uplink transmission based on the transmission time.

Another apparatus for wireless communication is described. The apparatus may include means for receiving an indication that a TTI for an uplink transmission is full-duplex, determining, for the uplink transmission, a transmission time based on the TTI being full-duplex and an arrival time for a downlink transmission of the TTI, and transmitting the uplink transmission based on the transmission time.

A non-transitory computer-readable medium storing code for wireless communication is described. The code may include instructions executable by a processor to receive an indication that a TTI for an uplink transmission is full-duplex, determine, for the uplink transmission, a transmission time based on the TTI being full-duplex and an arrival time for a downlink transmission of the TTI, and transmit the uplink transmission based on the transmission time.

Some examples of the method, apparatuses, and non-transitory computer-readable medium described herein may further include operations, features, means, or instructions for receiving an indication of a first uplink timing for half-duplex TTIs and a second uplink timing for full-duplex TTIs, where the transmission time may be based on the second uplink timing.

In some examples of the method, apparatuses, and non-transitory computer-readable medium described herein, the first uplink timing may be based on a TA command and the second uplink timing may be based on the arrival time for downlink transmissions.

In some examples of the method, apparatuses, and non-transitory computer-readable medium described herein, determining the transmission time may include operations, features, means, or instructions for determining the transmission time as equal to the arrival time for the downlink transmission.

In some examples of the method, apparatuses, and non-transitory computer-readable medium described herein, determining the transmission time may include operations, features, means, or instructions for receiving an indication of an allowable offset relative to the arrival time for the downlink transmission, and determining the transmission time as within the allowable offset relative to the arrival time for the downlink transmission.

In some examples of the method, apparatuses, and non-transitory computer-readable medium described herein, the allowable offset may be based on a cyclic prefix length for the TTI.

Some examples of the method, apparatuses, and non-transitory computer-readable medium described herein may further include operations, features, means, or instructions for receiving a TA command for the TTI, where a TA indicated by the TA command may be specific to full-duplex TTIs.

Some examples of the method, apparatuses, and non-transitory computer-readable medium described herein may further include operations, features, means, or instructions for receiving a TA command for the TTI, and ignoring the TA command for the TTI based on the TTI being full-duplex.

Some examples of the method, apparatuses, and non-transitory computer-readable medium described herein may further include operations, features, means, or instructions for selecting a beam for the uplink transmission, where the beam may be included in a set of beams having different downlink timings, and where the downlink transmission may be via the beam.

Some examples of the method, apparatuses, and non-transitory computer-readable medium described herein may further include operations, features, means, or instructions for monitoring a control resource set (CORESET), and identifying the arrival time of the downlink transmission based on a reference signal for the CORESET.

Some examples of the method, apparatuses, and non-transitory computer-readable medium described herein may further include operations, features, means, or instructions for identifying a transmission configuration indicator (TCI) state for the CORESET, where the TCI state corresponds to a quasi-co-location (QCL) type for one or more reference signals of the CORESET, and selecting the reference signal for identifying the arrival time of the downlink transmission based on a corresponding QCL type.

Some examples of the method, apparatuses, and non-transitory computer-readable medium described herein may further include operations, features, means, or instructions for adjusting a fast Fourier transform (FFT) window to begin between the transmission time and the arrival time for the downlink transmission, where the FFT window may be for processing one or both of the downlink transmission and the uplink transmission.

In some examples of the method, apparatuses, and non-transitory computer-readable medium described herein, adjusting the FFT window may include operations, features, means, or instructions for identifying a start time for the FFT window corresponding to a maximum received signal-to-interference-plus-noise ratio (SINR), and setting the FFT window to have the start time.

Some examples of the method, apparatuses, and non-transitory computer-readable medium described herein may further include operations, features, means, or instructions for identifying a cyclic prefix length for the uplink transmission, where the cyclic prefix length may be based on the TTI being full-duplex and may be longer than at least one cyclic prefix length available for half-duplex TTIs.

Some examples of the method, apparatuses, and non-transitory computer-readable medium described herein may further include operations, features, means, or instructions for identifying an uplink frequency band for the uplink transmission, where the uplink frequency band may be separated from a downlink frequency band by a guard band that may be based on the TTI being full-duplex and may be larger than at least one guard band available for half-duplex TTIs.

A method of wireless communication is described. The method may include receiving an indication that a TTI for an uplink transmission is full-duplex, identifying a cyclic prefix length for the uplink transmission, where the cyclic prefix length is based on the TTI being full-duplex and is longer than at least one cyclic prefix length available for half-duplex TTIs, and transmitting the uplink transmission based on the cyclic prefix length.

An apparatus for wireless communication is described. The apparatus may include a processor, memory coupled with the processor, and instructions stored in the memory. The instructions may be executable by the processor to cause the apparatus to receive an indication that a TTI for an uplink transmission is full-duplex, identify a cyclic prefix length for the uplink transmission, where the cyclic prefix length is based on the TTI being full-duplex and is longer than at least one cyclic prefix length available for half-duplex TTIs, and transmit the uplink transmission based on the cyclic prefix length.

Another apparatus for wireless communication is described. The apparatus may include means for receiving an indication that a TTI for an uplink transmission is full-duplex, identifying a cyclic prefix length for the uplink transmission, where the cyclic prefix length is based on the TTI being full-duplex and is longer than at least one cyclic prefix length available for half-duplex TTIs, and transmitting the uplink transmission based on the cyclic prefix length.

A non-transitory computer-readable medium storing code for wireless communication is described. The code may include instructions executable by a processor to receive an indication that a TTI for an uplink transmission is full-duplex, identify a cyclic prefix length for the uplink transmission, where the cyclic prefix length is based on the TTI being full-duplex and is longer than at least one cyclic prefix length available for half-duplex TTIs, and transmit the uplink transmission based on the cyclic prefix length.

Some examples of the method, apparatuses, and non-transitory computer-readable medium described herein may further include operations, features, means, or instructions for receiving an indication of at least a first cyclic prefix length for half-duplex TTIs and at least a second cyclic prefix length for full-duplex TTIs, where identifying the cyclic prefix length includes identifying the second cyclic prefix length.

Some examples of the method, apparatuses, and non-transitory computer-readable medium described herein may further include operations, features, means, or instructions for receiving an indication of the cyclic prefix length, where identifying the cyclic prefix length may be based on the indication.

In some examples of the method, apparatuses, and non-transitory computer-readable medium described herein, identifying the cyclic prefix length may include operations, features, means, or instructions for selecting the cyclic prefix length from a set of cyclic prefix lengths that includes at least one cyclic prefix length available for full-duplex TTIs and the at least one cyclic prefix length available half-duplex TTIs.

In some examples of the method, apparatuses, and non-transitory computer-readable medium described herein, the cyclic prefix length may be specific to full-duplex TTIs.

In some examples of the method, apparatuses, and non-transitory computer-readable medium described herein, the cyclic prefix length may be longer than all cyclic prefix lengths available for half-duplex TTIs.

Some examples of the method, apparatuses, and non-transitory computer-readable medium described herein may further include operations, features, means, or instructions for identifying an arrival time for a downlink transmission of the TTI, where transmitting the uplink transmission occurs at a time based on the arrival time for the downlink transmission.

Some examples of the method, apparatuses, and non-transitory computer-readable medium described herein may further include operations, features, means, or instructions for identifying an uplink frequency band for the uplink transmission, where the uplink frequency band may be separated from a downlink frequency band by a guard band that may be based on the TTI being full-duplex and may be larger than at least one guard band available for half-duplex TTIs.

A method of wireless communication is described. The method may include receiving an indication that a TTI for an uplink transmission is full-duplex, identifying an uplink frequency band for the uplink transmission, where the uplink frequency band is separated from a downlink frequency band by a guard band that is based on the TTI being full-duplex and is larger than at least one guard band available for half-duplex TTIs, and transmitting the uplink transmission in the uplink frequency band.

An apparatus for wireless communication is described. The apparatus may include a processor, memory coupled with the processor, and instructions stored in the memory. The instructions may be executable by the processor to cause the apparatus to receive an indication that a TTI for an uplink transmission is full-duplex, identify an uplink frequency band for the uplink transmission, where the uplink frequency band is separated from a downlink frequency band by a guard band that is based on the TTI being full-duplex and is larger than at least one guard band available for half-duplex TTIs, and transmit the uplink transmission in the uplink frequency band.

Another apparatus for wireless communication is described. The apparatus may include means for receiving an indication that a TTI for an uplink transmission is full-duplex, identifying an uplink frequency band for the uplink transmission, where the uplink frequency band is separated from a downlink frequency band by a guard band that is based on the TTI being full-duplex and is larger than at least one guard band available for half-duplex TTIs, and transmitting the uplink transmission in the uplink frequency band.

A non-transitory computer-readable medium storing code for wireless communication is described. The code may include instructions executable by a processor to receive an indication that a TTI for an uplink transmission is full-duplex, identify an uplink frequency band for the uplink transmission, where the uplink frequency band is separated from a downlink frequency band by a guard band that is based on the TTI being full-duplex and is larger than at least one guard band available for half-duplex TTIs, and transmit the uplink transmission in the uplink frequency band.

Some examples of the method, apparatuses, and non-transitory computer-readable medium described herein may further include operations, features, means, or instructions for transmitting an indication of a preferred guard band, where the guard band may be based on the preferred guard band.

Some examples of the method, apparatuses, and non-transitory computer-readable medium described herein may further include operations, features, means, or instructions for receiving an indication of the uplink frequency band, where identifying the uplink frequency band may be based on the indication.

Some examples of the method, apparatuses, and non-transitory computer-readable medium described herein may further include operations, features, means, or instructions for receiving an indication of the guard band, where identifying the uplink frequency band includes determining the uplink frequency band based on the downlink frequency band and the guard band.

In some examples of the method, apparatuses, and non-transitory computer-readable medium described herein, the guard band may be specific to full-duplex TTIs.

In some examples of the method, apparatuses, and non-transitory computer-readable medium described herein, the guard band may be larger than all guard bands available for half-duplex TTIs.

Some examples of the method, apparatuses, and non-transitory computer-readable medium described herein may further include operations, features, means, or instructions for identifying an arrival time for a downlink transmission of the TTI, where transmitting the uplink transmission occurs at a time based on the arrival time for the downlink transmission.

Some examples of the method, apparatuses, and non-transitory computer-readable medium described herein may further include operations, features, means, or instructions for identifying a cyclic prefix length for the uplink transmission, where the cyclic prefix length may be based on the TTI being full-duplex and may be longer than at least one cyclic prefix length available for half-duplex TTIs.

A method of wireless communication is described. The method may include transmitting an indication that a TTI is full-duplex, transmitting, to a UE, a downlink transmission for the TTI, and receiving an uplink transmission for the TTI from the UE, where a timing of the uplink transmission is based on the TTI being full-duplex and an arrival time at the UE for the downlink transmission.

An apparatus for wireless communication is described. The apparatus may include a processor, memory coupled with the processor, and instructions stored in the memory. The instructions may be executable by the processor to cause the apparatus to transmit an indication that a TTI is full-duplex, transmit, to a UE, a downlink transmission for the TTI, and receive an uplink transmission for the TTI from the UE, where a timing of the uplink transmission is based on the TTI being full-duplex and an arrival time at the UE for the downlink transmission.

Another apparatus for wireless communication is described. The apparatus may include means for transmitting an indication that a TTI is full-duplex, transmitting, to a UE, a downlink transmission for the TTI, and receiving an uplink transmission for the TTI from the UE, where a timing of the uplink transmission is based on the TTI being full-duplex and an arrival time at the UE for the downlink transmission.

A non-transitory computer-readable medium storing code for wireless communication is described. The code may include instructions executable by a processor to transmit an indication that a TTI is full-duplex, transmit, to a UE, a downlink transmission for the TTI, and receive an uplink transmission for the TTI from the UE, where a timing of the uplink transmission is based on the TTI being full-duplex and an arrival time at the UE for the downlink transmission.

Some examples of the method, apparatuses, and non-transitory computer-readable medium described herein may further include operations, features, means, or instructions for transmitting, to the UE, an indication of a first uplink timing for half-duplex TTIs and a second uplink timing for full-duplex TTIs, where the timing of the uplink transmission may be based on the second uplink timing.

Some examples of the method, apparatuses, and non-transitory computer-readable medium described herein may further include operations, features, means, or instructions for transmitting, to the UE, an indication that the UE is to transmit the uplink transmission at a time equal to the arrival time at the UE for the downlink transmission.

Some examples of the method, apparatuses, and non-transitory computer-readable medium described herein may further include operations, features, means, or instructions for transmitting, to the UE, an indication of an allowable offset relative to the arrival time at the UE for the downlink transmission, where the timing of the uplink transmission may be based on the allowable offset.

Some examples of the method, apparatuses, and non-transitory computer-readable medium described herein may further include operations, features, means, or instructions for transmitting, to the UE, a TA command for the TTI, where the TA command indicates a TA that may be specific to full-duplex TTIs.

A method of wireless communication is described. The method may include transmitting, to a UE, an indication that a TTI is full-duplex, identifying a cyclic prefix length for the TTI, where the cyclic prefix length is based on the TTI being full-duplex and is longer than at least one cyclic prefix length available for half-duplex TTIs, and communicating with the UE, during the TTI, based on the cyclic prefix length.

An apparatus for wireless communication is described. The apparatus may include a processor, memory coupled with the processor, and instructions stored in the memory. The instructions may be executable by the processor to cause the apparatus to transmit, to a UE, an indication that a TTI is full-duplex, identify a cyclic prefix length for the TTI, where the cyclic prefix length is based on the TTI being full-duplex and is longer than at least one cyclic prefix length available for half-duplex TTIs, and communicate with the UE, during the TTI, based on the cyclic prefix length.

Another apparatus for wireless communication is described. The apparatus may include means for transmitting, to a UE, an indication that a TTI is full-duplex, identifying a cyclic prefix length for the TTI, where the cyclic prefix length is based on the TTI being full-duplex and is longer than at least one cyclic prefix length available for half-duplex TTIs, and communicating with the UE, during the TTI, based on the cyclic prefix length.

A non-transitory computer-readable medium storing code for wireless communication is described. The code may include instructions executable by a processor to transmit, to a UE, an indication that a TTI is full-duplex, identify a cyclic prefix length for the TTI, where the cyclic prefix length is based on the TTI being full-duplex and is longer than at least one cyclic prefix length available for half-duplex TTIs, and communicate with the UE, during the TTI, based on the cyclic prefix length.

Some examples of the method, apparatuses, and non-transitory computer-readable medium described herein may further include operations, features, means, or instructions for transmitting, to the UE, an indication of at least a first cyclic prefix length for half-duplex TTIs and at least a second cyclic prefix length for full-duplex TTIs, where the cyclic prefix length may be equal to the second cyclic prefix length.

Some examples of the method, apparatuses, and non-transitory computer-readable medium described herein may further include operations, features, means, or instructions for transmitting, to the UE, an indication of the cyclic prefix length, where the cyclic prefix length may be based on the indication.

In some examples of the method, apparatuses, and non-transitory computer-readable medium described herein, identifying the cyclic prefix length may include operations, features, means, or instructions for selecting the cyclic prefix length from a set of cyclic prefix lengths that includes at least one cyclic prefix length associated with full-duplex TTIs and the at least one cyclic prefix length available for half-duplex TTIs.

A method of wireless communication is described. The method may include transmitting, to a UE, an indication that a TTI for an uplink transmission is full-duplex, identifying a guard band for the TTI, where the guard band is based on the TTI being full-duplex and is larger than at least one guard band available for half-duplex TTIs, and communicating with the UE, during the TTI, based on the guard band.

An apparatus for wireless communication is described. The apparatus may include a processor, memory coupled with the processor, and instructions stored in the memory. The instructions may be executable by the processor to cause the apparatus to transmit, to a UE, an indication that a TTI for an uplink transmission is full-duplex, identify a guard band for the TTI, where the guard band is based on the TTI being full-duplex and is larger than at least one guard band available for half-duplex TTIs, and communicate with the UE, during the TTI, based on the guard band.

Another apparatus for wireless communication is described. The apparatus may include means for transmitting, to a UE, an indication that a TTI for an uplink transmission is full-duplex, identifying a guard band for the TTI, where the guard band is based on the TTI being full-duplex and is larger than at least one guard band available for half-duplex TTIs, and communicating with the UE, during the TTI, based on the guard band.

A non-transitory computer-readable medium storing code for wireless communication is described. The code may include instructions executable by a processor to transmit, to a UE, an indication that a TTI for an uplink transmission is full-duplex, identify a guard band for the TTI, where the guard band is based on the TTI being full-duplex and is larger than at least one guard band available for half-duplex TTIs, and communicate with the UE, during the TTI, based on the guard band.

In some examples of the method, apparatuses, and non-transitory computer-readable medium described herein, identifying the guard band may include operations, features, means, or instructions for selecting the guard band from a set of guard bands that includes the at least one guard band available for half-duplex TTIs and at least a second guard band available for full-duplex TTIs, where the guard band may be equal to the second guard band.

Some examples of the method, apparatuses, and non-transitory computer-readable medium described herein may further include operations, features, means, or instructions for receiving, from the UE, an indication of a preferred guard band, where identifying the guard band may be based on the preferred guard band.

Some examples of the method, apparatuses, and non-transitory computer-readable medium described herein may further include operations, features, means, or instructions for transmitting, to the UE, an indication of the guard band or of a frequency band that may be based on the guard band.

DETAILED DESCRIPTION

Figure 1:
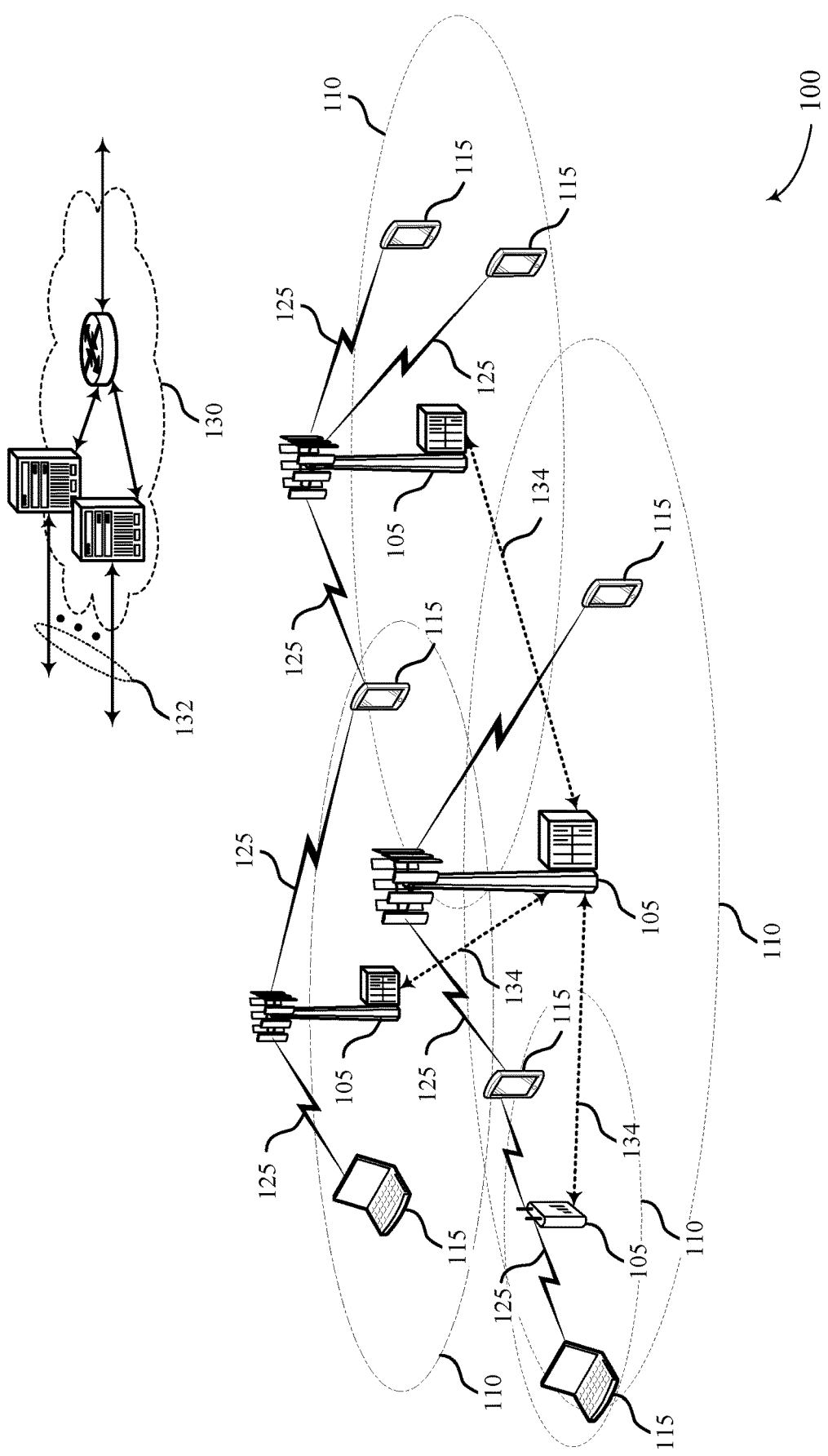
FIG. 1 illustrates an example of a wireless communications system that supports interference mitigation for full-duplex communication in accordance with aspects of the present disclosure.

Wireless communications devices operating in a wireless communications network (e.g., a New Radio (NR) network) may use various duplexing arrangements for coordinating uplink and downlink transmissions. For example, a base station and a user equipment (UE) may communicate using full-duplex transmissions, where a full-duplex transmission time interval (TTI) may include the base station transmitting downlink data and the UE transmitting uplink data over the same time interval. Due to delays in signal propagation, the UE may process downlink data on a part of a TTI in which the UE also transmits uplink data (e.g., the edges of a received downlink frame and a transmitted uplink frame may be misaligned as observed by the UE), where the fact that the signals overlap in part (e.g., as opposed to completely overlapping) may cause self-interference. In some cases, the base station and the UE may therefore implement interference mitigation techniques to reduce the amount of self-interference experienced by the UE during full-duplex communications.

For example, the base station may signal or otherwise configure the UE to adjust the timing of uplink transmissions (e.g., the time at which the UE begins transmitting an uplink frame) using a timing alignment. In some cases, the base station may signal the UE to indicate a timing alignment to use for full-duplex transmissions and a different timing advance (TA) to use for other transmissions (e.g., half-duplex transmissions), where the UE may use the appropriate timings for the corresponding transmissions. For example, the base station may indicate that the UE is to communicate using one or more full-duplex TTIs and may further indicate that the UE is to align the beginning of uplink transmissions (frames, subframes, symbols, etc.) with, or otherwise based on, a time that the UE receives downlink transmissions (e.g., a time at which downlink transmission frames, subframes, symbols, etc. arrive at the UE, which may be referred to as a downlink arrival time). Additionally or alternatively, the base station may indicate a timing alignment window to the UE, in order to mitigate interference at the base station, where the window may include an allowed time period from which the UE may select a time to begin uplink transmissions. In some cases, the base station may set the window based on a cyclic prefix length, based on the time between the TA and the downlink arrival time, or based on a defined window of time (e.g., five nanoseconds) preceding the downlink arrival time.

In some cases, the base station may indicate that the downlink arrival time is based on a specific beam direction, such as a specific downlink beam (e.g., a specific synchronization signal block (SSB)), and thus uplink transmissions corresponding to different beam directions may use different uplink timings. Additionally or alternatively, the UE may identify the downlink arrival time using a reference signal from a set of control resources, where the reference signal may additionally be identified using a transmission configuration identifier (TCI) state based on a specific quasi-co-location (QCL) type.

In some examples, the base station may select an adjusted cyclic prefix length for mitigating self-interference in full-duplex communications, and may signal the UE to implement the adjusted cyclic prefix length. For example, the base station may select (e.g., from a set of cyclic prefixes) a cyclic prefix corresponding to full-duplex communications, where the cyclic prefix may be longer than at least one cyclic prefix used for other communications (e.g., half-duplex communications). In some cases, the cyclic prefix for full-duplex communications may be longer than any cyclic prefix used for half-duplex communications.

Additionally or alternatively, the base station may select frequency resources (e.g., frequency bands) for uplink and downlink communications such that the resources are separated by a guard band, where the guard band for full-duplex communications may be larger than at least one guard band used for other communications (e.g., half-duplex communications). In some cases, the guard band for full-duplex communications may be larger than any guard band used for other communications (or at least longer than any guard band used for half-duplex communications). In some cases, an uplink frequency band and a downlink frequency band may be located at edges of a frequency carrier—with the guard band between—which may further mitigate interference. In some examples, the UE may signal the base station indicating a preferred guard band (e.g., based on UE capabilities, based on being scheduled for full-duplex communications, etc.), and the base station may select frequency resources for the UE based on the preferred guard band indicated by UE. Following resource selection, the base station may signal the UE regarding the location of the downlink and uplink bands for full-duplex TTIs. In some cases, the base station may directly (explicitly) signal the frequency locations of the downlink or uplink bands to the UE. Additionally or alternatively, the base station may indicate the location of the downlink frequency band (or uplink frequency band) and the size of a guard band to the UE such that the UE may determine the location of the uplink frequency band (or downlink frequency band).

In some cases, the UE may adjust a window for performing a fast Fourier transform (FFT) on wireless data, where the UE may use the FFT to process uplink and/or downlink communications. In some examples, the UE may adjust the timing of the FFT window (e.g., window position) to minimize the impact of self-interference. For example, the UE may characterize a signal quality measurement as a function of the FFT window position, may determine the window position that maximizes the signal quality, and may set the FFT window to the determined position.

Aspects of the disclosure are initially described in the context of wireless communications systems. Aspects of the disclosure are further illustrated by and described with reference to a timing alignment scheme, a frequency resource allocation, an FFT timing, apparatus diagrams, system diagrams, and flowcharts that relate to interference mitigation for full-duplex communication.

FIG. 1 illustrates an example of a wireless communications system 100 that supports interference mitigation for full-duplex communication in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-*based business charging*.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless devices operating in an NR system may employ full-duplex communications in some cases, e.g., to increase throughput and reduce latency in communication. For example, if a UE 115 were to use a TDD or half-duplex configuration to communicate with a base station 105, the UE 115 may not receive downlink signals when transmitting on an uplink TTI. However, a full-duplex TTI may allow a UE 115 to simultaneously receive downlink signals and transmit uplink signals, which may increase throughput. Similarly, a full-duplex TTI may decrease latency by allowing the UE 115 to transmit feedback or other signals (e.g., at a low code rate) while receiving downlink data.

Additionally, a UE 115 may process uplink and downlink data based on an FFT and an associated FFT window, where performance (e.g., an observed signal to noise plus interference ratio (SINR)) may be proportional to an amount of isolation (e.g., in frequency and/or time) between the downlink and uplink signals. For example, a UE 115 may experience inter-carrier interference if the FFT picks up partial values from an adjacent component carrier. Similarly, a UE 115 may experience inter-symbol interference if the FFT picks up values from an adjacent symbol. Thus, if the timing of the FFT is synchronized with a reception of downlink transmissions at the UE 115, the timing of the FFT may therefore not align with the entirety of the uplink timing. For example, if uplink transmissions are sent on a different set of resource blocks corresponding to the same band as the downlink transmissions, the mismatch in timing may destroy orthogonality in the OFDM carriers or may cause symbols associated with a different TTI to be observed during the FFT window and thus may cause inter-carrier interference. In some cases, however, the UE 115 may be able to more easily cancel interference if the downlink and uplink timings are more closely aligned (e.g., due to the properties of the FFT).

A UE 115 may receive a TA command from a base station 105, where the TA may specify that the UE 115 transmit uplink frames (e.g., uplink TTIs) slightly ahead of the time the frame is to reach the base station. In some cases, the TA may account for propagation delay and may allow the base station 105 to receive the uplink frame in a target uplink receive window. In a full-duplex TTI, the UE 115 may also receive a downlink frame from the base station 105 during the same TTI in which the UE 115 transmits an uplink frame. In some examples, due to the fact that the uplink frame may be transmitted earlier than the downlink frame (e.g., due to the TA), the uplink and downlink frames may not completely overlap at the UE 115. Therefore, a part of the uplink frame may partially overlap with the downlink frame and may cause self-induced inter-carrier interference (e.g., adjacent channel leakage) on the downlink frame reception.

Accordingly, a UE 115 and a base station 105 may employ interference mitigation techniques for full-duplex communications. In some examples, the base station 105 may signal for the UE 115 to begin transmitting uplink communications at the same time the UE 115 begins receiving downlink communications. Additionally or alternatively, the base station 105 may indicate a window or offset in which the UE 115 may begin uplink communications, which may allow for the uplink transmissions to better align with the reception of downlink transmissions. In some cases, the base station 105 may employ a cyclic prefix length defined for full-duplex communications, where the cyclic prefix length may be longer than a cyclic prefix length used for other communications (e.g., half-duplex communications). Additionally or alternatively, the base station 105 may identify and implement a guard band (e.g., between an uplink band and a downlink band) for full-duplex communications, where the guard band may be larger than a guard band for other communications (e.g., half-duplex communications). Further, as described herein, a UE 115 configured for full-duplex communications may, in some cases, adjust a window used for FFT processing (e.g., relative to the window used when configured for half-duplex communications) based on one or more observed performance metrics (e.g., to maximize an observed SINR for downlink transmissions).

Figure 2:
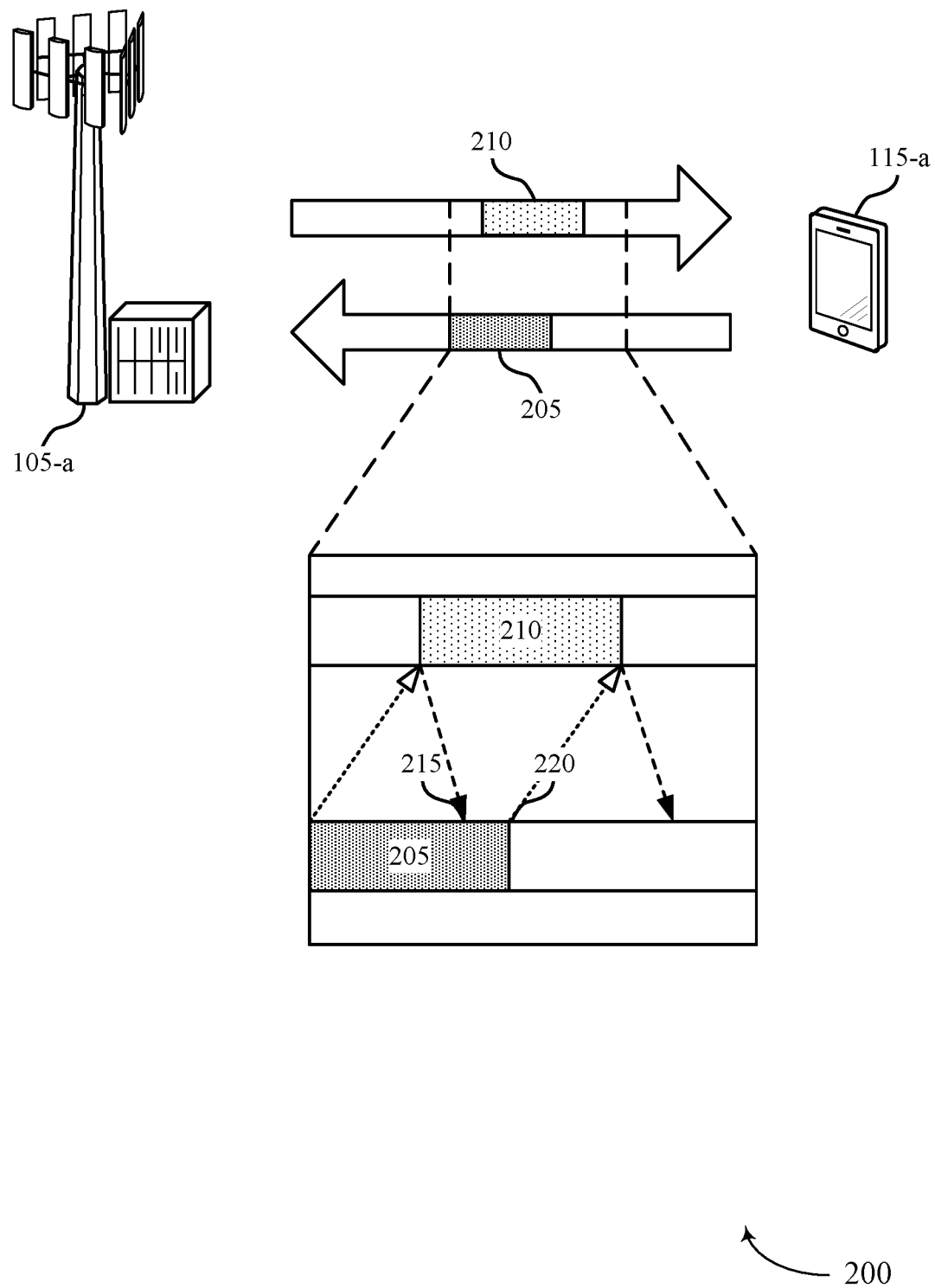
FIG. 2 illustrates an example of a wireless communications system that supports interference mitigation for full-duplex communication in accordance with aspects of the present disclosure.

FIG. 2 illustrates an example of a wireless communications system 200 that supports interference mitigation for full-duplex communication in accordance with aspects of the present disclosure. In some examples, wireless communications system 200 may implement aspects of wireless communication system 100 and may include a UE 115-*a* and a base station 105-*a*, which may be examples of a UE 115 and a base station 105 described with reference to FIG. 1. In some cases, UE 115-*a* and base station 105-*a* may communicate with each other using one or more full-duplex slots and may therefore experience higher inter-carrier interference and/or inter-symbol interference. As such, UE 115-*a* and base station 105-*a* may employ one or more full-duplex interference mitigation techniques.

UE 115-*a* may, in some cases, transmit uplink transmissions 205 (e.g., uplink frames, subframes, symbols, etc.) with a defined TA such that uplink transmissions 205 reach base station 105-*a* at a same time that base station 105-*a* begins transmitting downlink transmissions 210 to UE 115-*a*. In some cases, the timing of these two transmissions and the delay in propagation may cause downlink transmissions 210 (e.g., downlink frames, subframes, symbols, etc.) to reach UE 115-*a* at a downlink arrival time 215, which may occur after uplink transmissions 205 begin transmitting and before uplink transmissions 205 are finished transmitting (e.g., before an uplink termination time 220). In some examples, the partial overlap of uplink transmissions 205 and downlink transmissions 210 (e.g., the time between downlink arrival time 215 and uplink termination time 220) may cause self-induced interference (e.g., channel leakage) at UE 115-*a*. As such, base station 105-*a* and UE 115-*a* may mitigate the interference by implementing one or more of a timing alignment adjustment (e.g., relative to a TA command, relative to an uplink timing used for half-duplex communications), a larger cyclic prefix size, a larger frequency guard band, or an FFT adjustment.

In some cases, base station 105-*a* may indicate (e.g., using downlink control information (DCI), RRC signaling, MAC control elements (CEs), etc.) for UE 115-*a* to adjust or otherwise utilize a timing alignment for uplink transmissions 205. In some examples, base station 105-*a* may indicate for UE 115-*a* to align the beginning of uplink transmissions 205 with the time UE 115-*a* begins receiving downlink transmissions 210 (e.g., align uplink transmissions 205 with downlink arrival time 215). For example, base station 105-*a* may signal UE 115-*a* (e.g., using DCI, RRC signaling, MAC CEs, etc.) to indicate an uplink timing for full-duplex communications, where the uplink timing may align with downlink arrival time 215. Further, base station 105-*a* may signal UE 115-*a* (e.g., using DCI, RRC signaling, MAC CEs, etc.) to indicate a separate uplink timing for communications that are not full-duplex (e.g., half-duplex communications), where the separate uplink timing may be based on a TA command used to account for propagation delay (e.g., and may not align with downlink arrival time 215).

Additionally or alternatively, base station 105-*a* may signal UE 115-*a* (e.g., using DCI, RRC signaling, MAC CEs, etc.) to indicate an allowable offset (e.g., a window) from downlink arrival time 215, within which UE 115-*a* may begin uplink transmissions 205. In some examples, the allowable offset may be based on (e.g., equal to) a cyclic prefix length used for an uplink transmission 205 or may include times between the defined TA and downlink arrival time 215. For example, base station 105-*a* may signal UE 115-*a* to indicate that the allowable offset includes a window of defined duration (e.g., for the sake of numerical example and related clarity only, 5 nanoseconds) prior to downlink arrival time 215. In some cases, the indicated offset from downlink arrival time 215 may support selection of a timing for uplink transmissions (e.g., by UE 115-*a*) that may mitigate interference introduced at base station 105-*a* when the uplink and downlink transmissions fully align at UE 115-*a*, while also supporting interference mitigation for interference observed by the UE 115-*a*.

In some cases, the timing alignment may be beam specific (e.g., may vary across different beam directions). For example, the timing alignment may be based on an SSB index for downlink transmissions 210 via a specific downlink beam, corresponding to a beam direction for uplink transmissions 205. Additionally or alternatively, the timing alignment may be based on a TCI state (e.g., as specified by an SSB index or a beam specific TCI) for a downlink channel corresponding to downlink transmissions 210. For example, the timing alignment for uplink transmissions 205 may correspond to downlink arrival time 215, where UE 115-*a* may identify the downlink arrival time 215 by monitoring a control resource set (CORESET) and identifying downlink arrival time 215 based on a reference signal for the CORESET. In some examples, UE 115-*a* may also identify a TCI state (e.g., corresponding to a quasi-co-location type) for one or more reference signals of the CORESET, and may use the TCI state to select the reference signal to monitor and identify downlink arrival time 215. Additionally or alternatively, UE 115-*a* may adjust the uplink timing based on a downlink-timing-based physical uplink control channel (PUCCH) group. In some cases, the downlink timing (e.g., downlink arrival time 215) may also be based on a physical downlink control channel (PDCCH) group, which UE 115-*a* may use to identify the downlink timing.

Additionally or alternatively, base station 105-*a* may configure UE 115-*a* (e.g., via DCI, RRC signaling, MAC CEs, etc.) to use a specified cyclic prefix length for full-duplex transmissions to minimize the impact of self-interference. For example, base station 105-*a* may indicate that UE 115-*a* and base station 105-*a* are to use a defined cyclic prefix length when communicating using TTIs that are not full-duplex (e.g., half-duplex communications), and may further indicate that UE 115-*a* and base station 105-*a* are to use a different (e.g., longer) cyclic prefix when communicating using full-duplex TTIs. For example, a full-duplex cyclic prefix length may be longer than any cyclic prefix length used for half-duplex TTIs, or at least for any cyclic prefix length used for half-duplex TTIs on a same or similar size of serving cell as the serving cell in which base station 105-a and UE 115-a communicate. In some cases, base station 105-a may define the half-duplex and full-duplex cyclic prefix lengths based on a slot size (e.g., TTI size) used for communicating with UE 115-a. In some examples, UE 115-a may signal a preferred guard band distance (e.g., a frequency separation between uplink transmissions 205 and downlink transmissions 210) to base station 105-a. After receiving the preferred guard band, base station 105-a may use or consider the preferred guard band to schedule frequency resources for both base station 105-a (e.g., downlink frequency band) and for UE 115-a (e.g., uplink frequency band). Following the scheduling, base station 105-a may communicate the location of the frequency resources to UE 115-a, upon which UE 115-a and base station 105-a may use the respective frequency resources for full-duplex communications. In some examples, the guard band between uplink and downlink resources may be larger than some or all guard bands used for communications that are not full-duplex (e.g., half-duplex communications). For example, base station 105-a and UE 115-a may transmit uplink transmissions 205 and downlink transmissions 210 at edges of a frequency band used for wireless communications (e.g., using FDM).

In some cases, UE 115-a may also determine to adjust an FFT window, where the FFT window may be used for processing downlink transmissions 210 and/or uplink transmissions 205. In some examples, the FFT window may cause self-interference when a beginning of the FFT window aligns with downlink arrival time 215 (e.g., due to an offset relative to edges of uplink transmission 205). As such, UE 115-a may mitigate the impact of the self-interference by adjusting the FFT window position. In some cases, the beginning of the FFT window may be adjusted to align with any time between the beginning of uplink transmissions 205 and downlink arrival time 215 or may be adjusted to align with any time between downlink arrival time 215 and uplink termination time 220. In some examples, different FFT window positions (e.g., FFT timings) may cause different amounts of interference or power loss. For example, an FFT timing supporting better downlink reception may have a good signal power but high inter-carrier interference, while an FFT timing supporting better uplink transmission may have good interference rejection but a low power.

As such, UE 115-a may characterize a signal quality (e.g., SINR) for different FFT timings and may select the FFT window that yields the highest signal quality. In one example, UE 115-a may map a signal quality (e.g., SINR) as a function of FFT timing and set the FFT timing such that the signal quality is maximized. Additionally or alternatively, UE 115-a may adjust the FFT timing as a function of the downlink channel, a signal power, an uplink power, or the amount of self-interference (e.g., based on an interference measurement).

Figure 3:
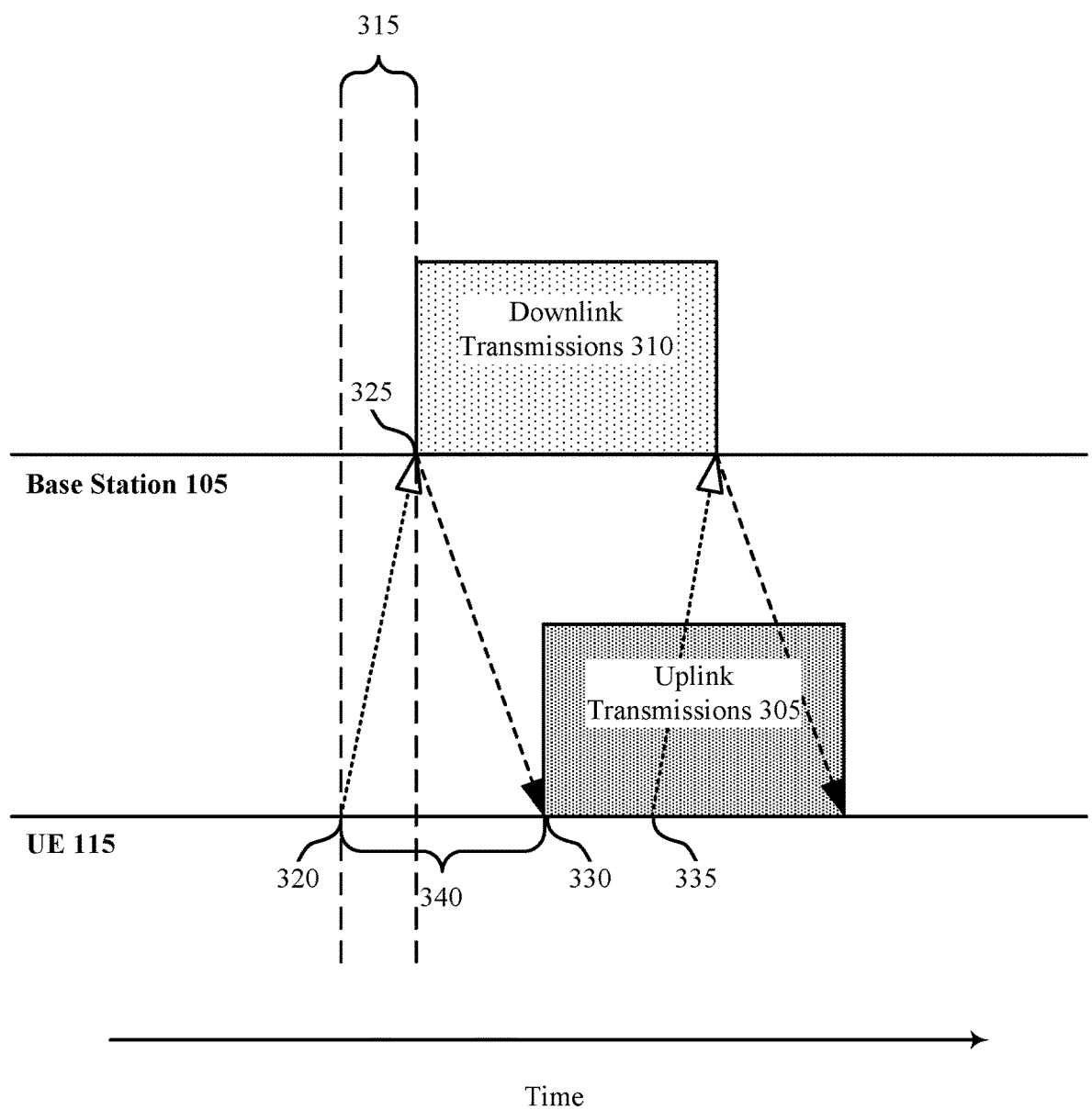
FIG. 3 illustrates an example of a timing alignment scheme that supports interference mitigation for full-duplex communication in accordance with aspects of the present disclosure.

FIG. 3 illustrates an example of a timing alignment scheme 300 that supports interference mitigation for full-duplex communication in accordance with aspects of the present disclosure. In some examples, timing alignment scheme 300 may implement aspects of wireless communication systems 100 or 200. Timing alignment scheme 300 may be implemented by a base station 105 and a UE 115, which may be examples of a base station 105 and a UE 115, as described with reference to FIGS. 1 and 2. As described herein with reference to FIG. 2, the base station 105 and the UE 115 may employ aspects of timing alignment scheme 300 to implement a timing alignment or to identify a cyclic prefix for full-duplex transmissions. In some examples, the full-duplex transmissions may include uplink transmissions 305 and downlink transmissions 310, both of which may occupy a same TTI.

As part of an acquisition process, the base station 105 may signal the UE 115 regarding a TA 315 (e.g., the base station 105 may transmit a TA command to the UE 115). In some cases, the TA 315, if followed by the UE 115, may ensure that uplink transmissions 305 reach the base station at a beginning of a TTI (e.g., with reference to the base station), due to an over-the-air time. In other words, the TA 315 specified by the TA command may correspond to an uplink transmit time 320, such that were the TA command followed by the UE, uplink transmissions 305 would reach the base station 105 at a downlink transmission time 325 (e.g., the beginning of the TTI) and the UE 115 would finish transmitting uplink transmissions 305 at an uplink termination time 335. For a full-duplex TTI, the base station 105 may begin downlink transmissions 310 at downlink transmission time 325 and downlink transmissions 310 may arrive at the UE 115 at a downlink arrival time 330. Such a configuration may introduce higher self-interference at the UE 115.

Accordingly, the base station 105 and the UE 115 may employ a timing alignment scheme 300 in order to reduce the self-interference caused by the overlap between downlink arrival time 330 and uplink termination time 335, when using a TA. In some cases, the base station 105 may signal the UE 115 (e.g., via RRC signaling, DCI, MAC CEs, etc.) to indicate a timing alignment for uplink transmissions 305. Moreover, upon receiving the timing alignment from the base station 105, the UE 115 may determine to follow the indicated timing alignment command or configuration for full-duplex TTIs instead of the TA command (e.g., the UE 115 may follow the TA command for half-duplex TTIs but ignore the TA command for full-duplex TTIs). In some examples, the timing alignment may include a new uplink transmit time, which may align with downlink arrival time 330. In some cases, the better alignment of uplink transmissions 305 and downlink transmissions 310 at the UE 115 may reduce interference as observed at the UE 115.

Further, the alignment of communications at the UE 115 may introduce a misalignment between uplink transmissions 305 and downlink transmissions 310 at the base station 105. Therefore, in some cases, in order to reduce interference at the base station 105 (e.g., due to a lack of orthogonality), the timing alignment may specify a timing alignment window 340 within which the UE 115 may choose a start time for uplink transmissions 305. In some cases, timing alignment window 340 may be based on (e.g., equal to) a cyclic prefix length or may include all times between downlink arrival time 330 and the previously-indicated TA (e.g., uplink transmit time 320). Additionally or alternatively, timing alignment window 340 may be a specified window of time (e.g., five nanoseconds) before downlink arrival time 330.

In some cases, the timing alignment may be beam-specific, and may be based on an SSB index for downlink transmissions 310. Additionally or alternatively, the timing for uplink transmissions 305 may be based on a TCI state (e.g., as specified by an SSB index or a beam specific TCI) for a downlink channel corresponding to downlink transmissions 310. For example, the timing alignment for uplink transmissions 305 may correspond to downlink arrival time 330, where the UE 115 may identify downlink arrival time 330 by monitoring a CORESET and identifying downlink arrival time 330 based on a reference signal for the CORESET. In some examples, the UE 115 may also identify a TCI state (e.g., corresponding to a quasi-co-location type) for one or more reference signals of the CORESET, and may use the TCI state to select a reference signal to monitor and identify downlink arrival time 330. Additionally or alternatively, the base station 105 may indicate for the UE 115 to adjust uplink transmit time 320 based on a downlink-timing-based PUCCH group. In some cases, the UE 115 may also identify downlink arrival time 330 using a PDCCH group.

In some cases, the base station 105 may configure the UE 115 (e.g., via DCI, RRC signaling, MAC CEs, etc.) to use a specified cyclic prefix length for full-duplex transmissions to minimize the impact of self-interference. For example, base station 105 may configure the UE 115 to use a defined cyclic prefix length when communicating using TTIs that are not full-duplex (e.g., half-duplex communications) and to use a different (e.g., longer) cyclic prefix when communicating using full-duplex TTIs. Additionally or alternatively, the base station 105 may transmit (e.g., via RRC signaling, DCI, MAC CEs, etc.) an indication of one or more cyclic prefixes to be used for full-duplex communications and one or more cyclic prefixes to be used for half-duplex communications. After receiving the indication of the different cyclic prefix lengths from the base station 105, the UE 115 may select an appropriate cyclic prefix for uplink transmissions 305 using the one or more received cyclic prefixes. In some examples, the base station 105 may define the half-duplex and full-duplex cyclic prefix lengths based on a slot (e.g., TTI) size used for communicating with the UE 115. In some cases, the full-duplex cyclic prefix length may be longer than at least one or longer than any cyclic prefix length used for half-duplex TTIs. For example, the full-duplex cyclic prefix length may be longer than any cyclic prefix length used for half-duplex TTIs on a same or similar size of serving cell as the full-duplex TTIs.

Figure 4:
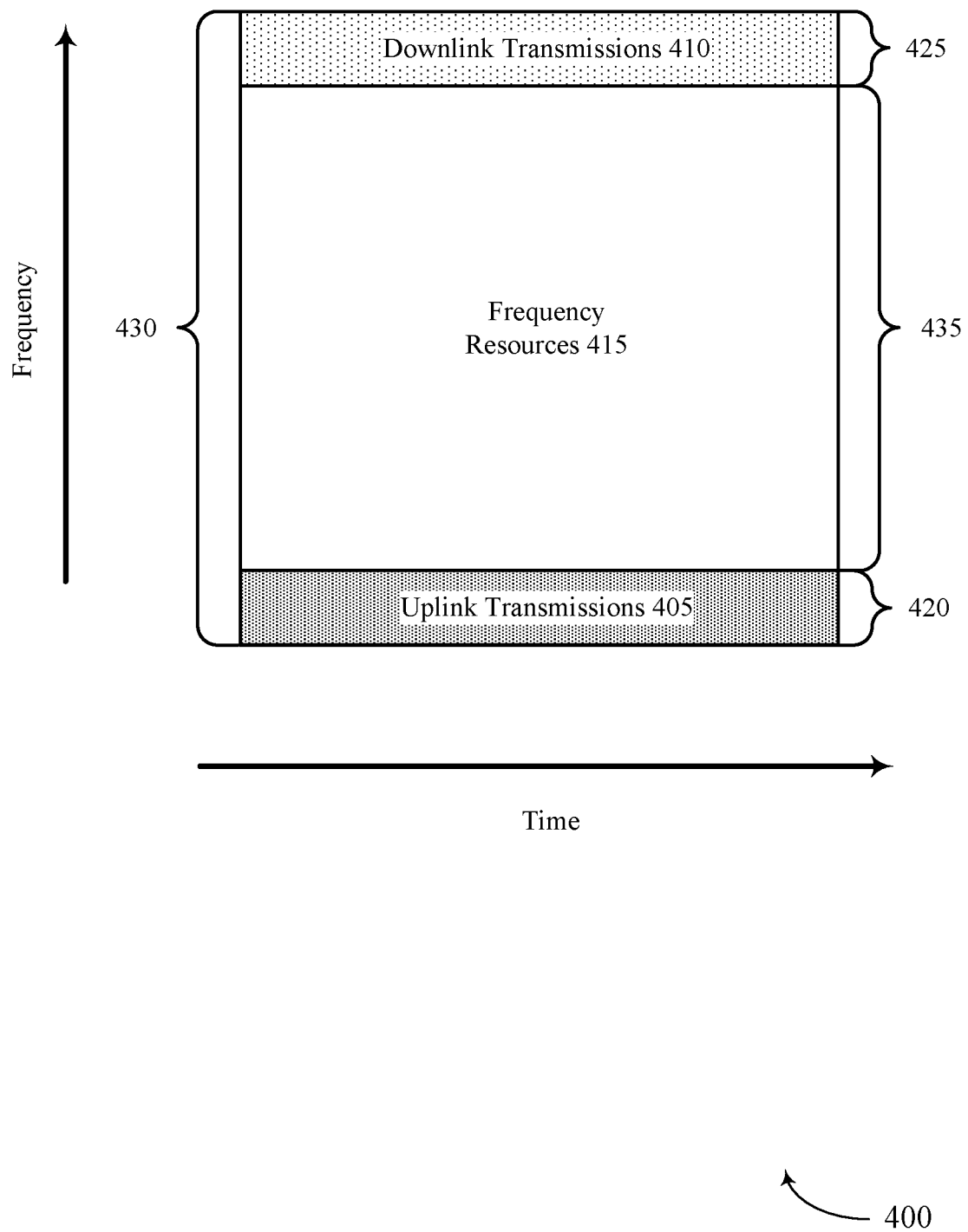
FIG. 4 illustrates an example of a frequency resource allocation that supports interference mitigation for full-duplex communication in accordance with aspects of the present disclosure.

FIG. 4 illustrates an example of a frequency resource allocation 400 that supports interference mitigation for full-duplex communication in accordance with aspects of the present disclosure. In some examples, frequency resource allocation 400 may implement aspects of wireless communication systems 100 and 200. Frequency resource allocation 400 may be implemented by a base station 105 and a UE 115, which may be examples of a base station 105 and a UE 115, as described with reference to FIGS. 1-3. As described herein with reference to FIG. 2, the base station 105 and the UE 115 may employ aspects of frequency resource allocation 400 to implement a frequency guard band between uplink and downlink transmissions within a full-duplex TTI. In some examples, the full-duplex transmissions may include uplink transmissions 405 and downlink transmissions 410, both of which may occupy one or more same TTIs within a set of frequency resources 415.

In some cases, the UE 115 may transmit uplink transmissions 405 and the base station 105 may transmit downlink transmissions 410 at the edges of a frequency band 430. In some examples, the UE 115 may signal a preferred guard band distance (e.g., based on the capabilities of the UE 115) to the base station 105. After receiving the preferred guard band, the base station 105 may determine a guard band based on the preferred guard band (e.g., as equal to the preferred guard band, with the preferred guard band considered as at least a candidate guard band among other possible guard bands, etc.) to schedule frequency resources for the base station 105 (e.g., downlink frequency band 425) and for the UE 115 (e.g., uplink frequency band 420). It is to be understood that downlink frequency band 425 and uplink frequency band 420 are not limited to the locations shown herein, but may be scheduled at any location within a given frequency band 430. In some cases, the location of uplink frequency band 420 and downlink frequency band 425 may be reversed or otherwise altered with respect to the example shown herein.

After scheduling the frequency resources, the base station 105 may communicate the location of uplink frequency band 420, downlink frequency band 425, or both to the UE 115. Additionally or alternatively, the base station 105 may signal the location of downlink frequency band 425 (or uplink frequency band 420) to the UE 115, along with an indication of a guard band 435 (e.g., between downlink frequency band 425 and uplink frequency band 420). Upon receiving the indication of downlink frequency band 425 (or uplink frequency band 420) and guard band 435, the UE 115 may determine the location of uplink frequency band 420 (or downlink frequency band 425).

In some cases, guard band 435 may be specific to full-duplex TTIs and may be larger than some or all guard bands used for communications that are not full-duplex (e.g., half-duplex communications). Additionally or alternatively, guard band 435 may be larger than any guard band used for communications that are not full-duplex. In some examples, the base station 105 may transmit (e.g., via RRC signaling, DCI, MAC CEs, etc.) an indication of a guard band 435 to be used for full-duplex communications and a guard band to be used for half-duplex communications.

Figure 5:
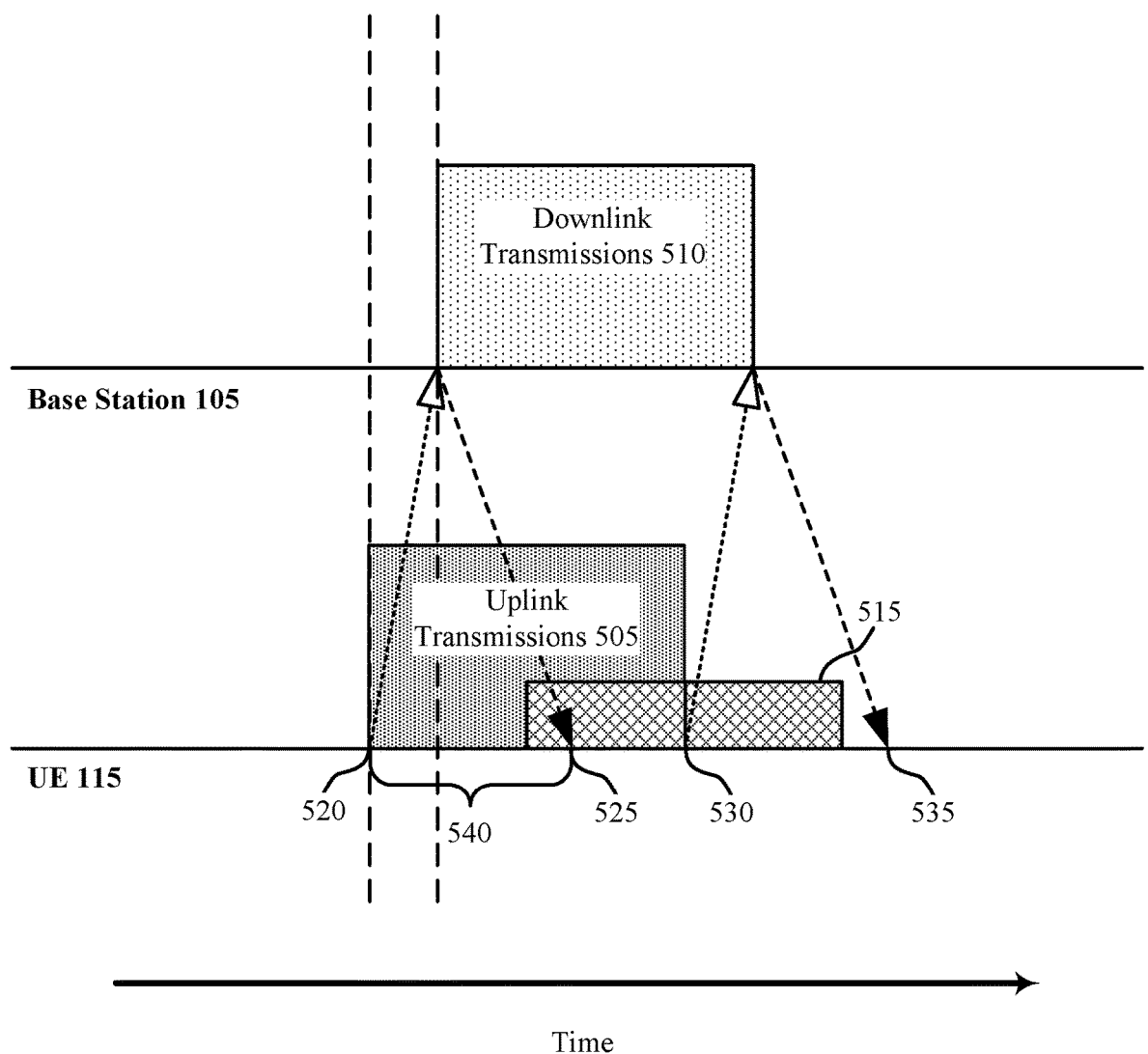
FIG. 5 illustrates an example of a fast Fourier transform (FFT) timing scheme that supports interference mitigation for full-duplex communication in accordance with aspects of the present disclosure.

FIG. 5 illustrates an example of an FFT timing scheme 500 that supports interference mitigation for full-duplex communication in accordance with aspects of the present disclosure. In some examples, FFT timing scheme 500 may implement aspects of wireless communication systems 100 or 200. FFT timing scheme 500 may be implemented by a base station 105 and a UE 115, which may be examples of a base station 105 and a UE 115, as described with reference to FIGS. 1-4. As described herein with reference to FIG. 2, the UE 115 may employ aspects of FFT timing scheme 500 to adjust an FFT window 515 associated with uplink and downlink transmissions within a full-duplex TTI. In some examples, the full-duplex transmissions may include uplink transmissions 505 and downlink transmissions 510, both of which may occupy a same TTI. In some cases, the UE 115 may employ FFT timing scheme 500 to mitigate an impact of interference, while also using a timing alignment window for uplink transmissions 505 or other interference mitigation technique as described herein (e.g., while also using any timing window adjustment, cyclic prefix size, or guard band for full-duplex operation, as described with reference to FIGS. 2-5). Alternatively, the UE 115 may employ FFT timing scheme 500 to mitigate interference in the absence of one or more other techniques as described herein.

In some cases, the UE 115 may determine to adjust FFT window 515, which may be used for processing downlink transmissions 510 and/or uplink transmissions 505. In some examples, FFT window 515 may cause self-interference when it aligns with a downlink arrival time 525 and a downlink termination time 535 (e.g., aligns with a portion of uplink transmissions 505). Accordingly, the UE 115 may adjust the impact of the self-interference by altering a position (e.g., FFT timing) of FFT window 515. In some cases, a beginning of FFT window 515 may be adjusted to align with any time between an uplink transmit time 520 and downlink arrival time 525 or may be adjusted to align with any time between downlink arrival time 525 and an uplink termination time 530. In some examples, different FFT timings may cause different amounts of interference or power loss. For example, an FFT timing supporting better downlink reception (e.g., beginning FFT window 515 at downlink arrival time 525) may result in a high signal power but high inter-carrier interference, while an FFT timing supporting better uplink transmission (e.g., beginning FFT window 515 at uplink termination time 530) may result in low inter-carrier interference and a low signal power.

The UE 115 may characterize a signal quality (e.g., SINR) for different FFT timings and may select a location for FFT window 515 that yields the highest signal quality. In one example, the UE 115 may map a signal quality (e.g., SINR) as a function of FFT timing and set the FFT timing such that the signal quality is maximized. Additionally or alternatively, UE 115-a may adjust the FFT timing as a function of the downlink channel, a signal power, an uplink power, or the amount of self-interference.

Figure 6:
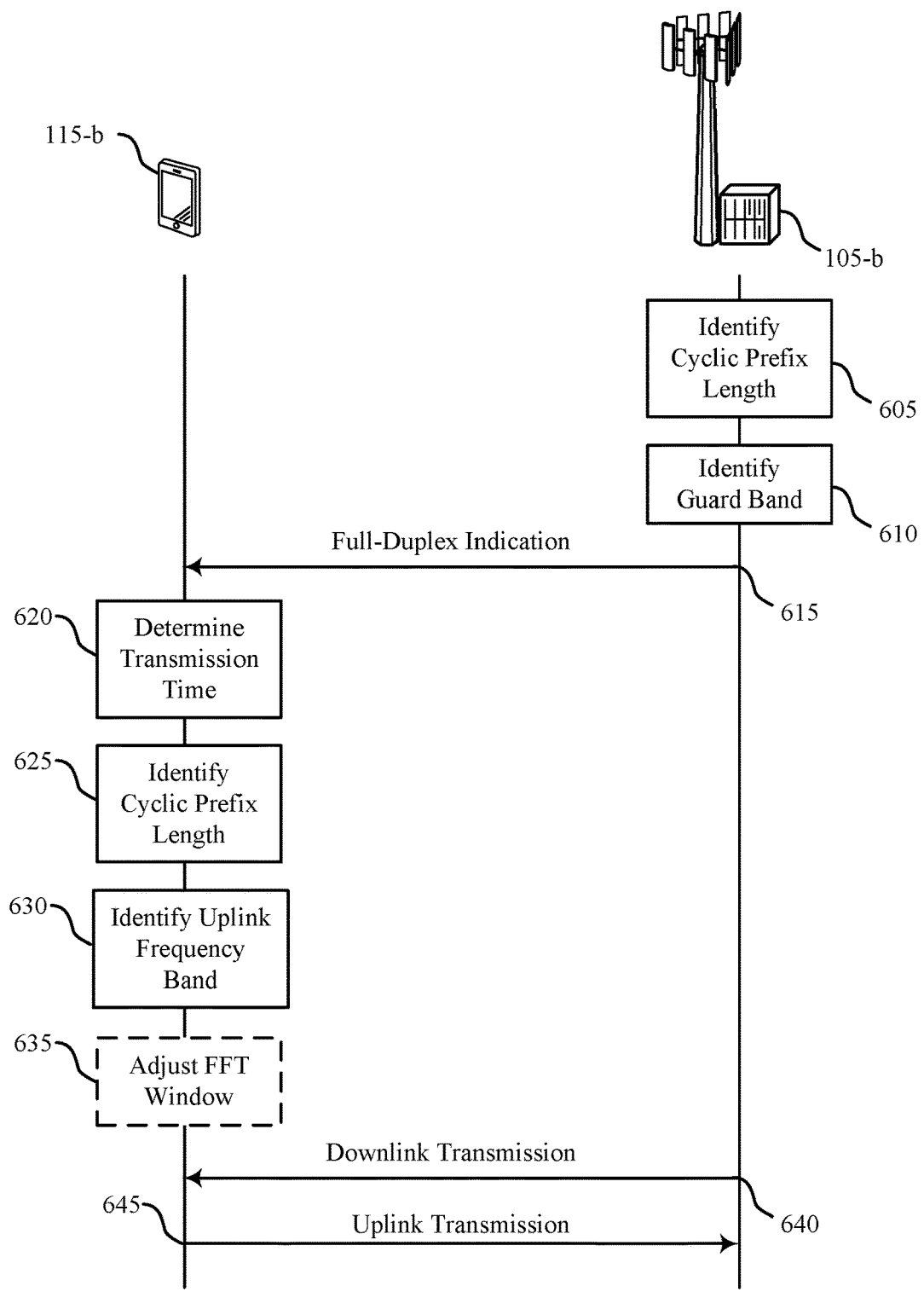
FIG. 6 illustrates an example of a process flow that supports interference mitigation for full-duplex communication in accordance with aspects of the present disclosure.

FIG. 6 illustrates an example of a process flow 600 that supports interference mitigation for full-duplex communication in accordance with aspects of the present disclosure. In some examples, process flow 600 may implement aspects of wireless communications systems 100 or 200. Additionally, process flow 600 may implement aspects of timing alignment scheme 300, frequency resource allocation 400, and FFT timing scheme 500. Further, process flow 600 may be implemented by a UE 115-b and a base station 105-b, which may be examples of a UE 115 and a base station 105 described with reference to FIGS. 1-5.

In the following description of the process flow 600, the operations between UE 115-b and base station 105-b may be transmitted in a different order than the order shown, or the operations performed by base station 105-b and UE 115-b may be performed in different orders or at different times. Some operations may also be left out of the process flow 600, or other operations may be added to the process flow 600. It is to be understood that while base station 105-b and UE 115-b are shown performing a number of the operations of process flow 600, any wireless device may perform the operations shown.

At 605, base station 105-b may identify a cyclic prefix length for a TTI, where the cyclic prefix length may be based on the TTI being full-duplex and may be longer than at least one cyclic prefix length available for half-duplex TTIs. Additionally or alternatively, the cyclic prefix length may be longer than all cyclic prefix lengths available for half-duplex TTIs. In some examples, selecting the prefix length may include selecting the cyclic prefix length from a set of cyclic prefix lengths that may include the at least one cyclic prefix length associated with full-duplex TTIs and the at least one cyclic prefix length available for half-duplex TTIs. Moreover, base station 105-b may communicate with UE 115-b, during the TTI, based on the cyclic prefix length.

At 610, base station 105-b may identify a guard band for the TTI, where the guard band may be based on the TTI being full-duplex and may be larger than at least one guard band available for half-duplex TTIs. In some cases, identifying the guard band may include selecting the guard band from a set of guard bands that includes the at least one guard band available for half-duplex TTIs and at least a second guard band available for full-duplex TTIs, where the guard band may be equal to the second guard band. In some examples, base station 105-b may receive, from UE 115-b (e.g., as a part of an acquisition procedure), an indication of a preferred guard band, where identifying the guard band may be based on the preferred guard band. Additionally, base station 105-b may communicate with UE 115-b *during the TTI based on the guard band.*

At 615, base station 105-b may transmit to UE 115-b an indication that a TTI for an uplink transmission is full-duplex. In some examples, base station 105-b may also indicate a first uplink timing for half-duplex TTIs and a second uplink timing for full-duplex TTIs. For example, the first uplink timing may be based on a TA command and the second uplink timing may be based on an arrival time for downlink transmissions. Additionally or alternatively, base station 105-b may transmit to UE 115-b a TA command for the TTI, where the TA command may indicate a TA that is specific to full-duplex TTIs. In some examples, UE 115-b may receive a TA command for the TTI and may ignore the TA command for the TTI based on the TTI being full-duplex. In some cases, base station 105-b may indicate that UE 115-b is to transmit the uplink transmission at a time equal to the arrival time for the downlink transmission at UE 115-b. In some other cases, base station 105-b may transmit an indication of an allowable offset relative to the arrival time for a downlink transmission at UE 115-b, where the timing of the uplink transmission may be based on the allowable offset. In some examples, the allowable offset may be based on a cyclic prefix length for the TTI.

Further, base station 105-b may indicate, to UE 115-b, at least a first cyclic prefix length for half-duplex TTIs and at least a second cyclic prefix length for full-duplex TTIs, where the cyclic prefix length (e.g., for the TTI) may be equal to the second cyclic prefix length. In some cases, base station 105-b may transmit an indication of the cyclic prefix length to UE 115-b.

Additionally, base station 105-b may transmit an indication, to UE 115-b, of an uplink frequency band, which in some cases may include an indication of a guard band or of a frequency band that is based on the guard band.

At 620, UE 115-b may determine, for the uplink transmission, a transmission time based on the TTI being full-duplex and the arrival time for the downlink transmission of the TTI. In some cases, the timing of the uplink transmission may be based on the second uplink timing (e.g., the timing for full-duplex TTIs). Additionally or alternatively, UE 115-b may determine the transmission time is equal to the arrival time for the downlink transmission, or may determine the transmission time within the allowable offset relative to the arrival time for the downlink transmission. In some examples, UE 115-b may monitor a CORESET and identify the arrival time of the downlink transmission based on a reference signal for the CORESET. In some cases, UE 115-b may identify a TCI state for the CORESET, where the TCI state may correspond to a quasi-co-location type for one or more reference signals of the CORESET and may select the reference signal for identifying the arrival time of the downlink transmission based on a corresponding quasi-co-location type. In some cases, determining the uplink transmission time may include selecting a beam for the uplink transmission, where the beam is included in a set of beams having different downlink timings, and where the downlink transmission is via the beam.

At 625, UE 115-b may identify a cyclic prefix length for the uplink transmission, where the cyclic prefix length may be based on the TTI being full-duplex and may be longer than at least one cyclic prefix length available for half-duplex TTIs. In some cases, identifying the cyclic prefix length may include identifying the second cyclic prefix length received from base station 105-b or may be based on the indication of the cyclic prefix length received from base station 105-b. Additionally or alternatively, identifying the cyclic prefix length may include selecting the cyclic prefix length from a set of cyclic prefix lengths that includes at least one cyclic prefix length available for full-duplex TTIs and the at least one cyclic prefix length available half-duplex TTIs. In some examples, the cyclic prefix length may be specific to full-duplex TTIs, and the cyclic prefix length may, in some cases, be longer than all cyclic prefix lengths available for half-duplex TTIs.

At 630, UE 115-b may identify the uplink frequency band for the uplink transmission, where the uplink frequency band may be separated from a downlink frequency band by a guard band that is based on the TTI being full-duplex and may be larger than at least one guard band available for half-duplex TTIs. In some examples, the guard band may be specific to full-duplex TTIs, and, in some cases, may be larger than all guard bands available for half-duplex TTIs. In one example, UE 115-b may transmit an indication of a preferred guard band to base station 105-b (e.g., as a part of an acquisition procedure), and the guard band may be based on the preferred guard band. Additionally or alternatively, UE 115-b may identify the uplink frequency band based on the indication received from base station 105-b. In some examples, identifying the uplink frequency band may include determining the uplink frequency band based on the downlink frequency band and the guard band (e.g., as received in the indication from base station 105-b).

At 635, UE 115-b may, in some cases, adjust an FFT window to begin between the transmission time and the arrival time for the downlink transmission, where the FFT window may be used for processing one or both of the downlink transmission and the uplink transmission. In some examples, adjusting the FFT window may include identifying a start time for the FFT window corresponding to a maximum received SINR (e.g., a signal quality) and setting the FFT window to have the start time.

At 640, base station 105-b may transmit, to UE 115-b, a downlink transmission for the TTI. In some cases, the downlink transmission may be based on the cyclic prefix length. Additionally or alternatively, the downlink transmission may be based on the guard band.

At 645, UE 115-b may transmit, to base station 105-b, the uplink transmission based on the uplink transmission time. Additionally or alternatively, the uplink transmission may be based on the cyclic prefix length and/or the uplink frequency band.

Figure 7:
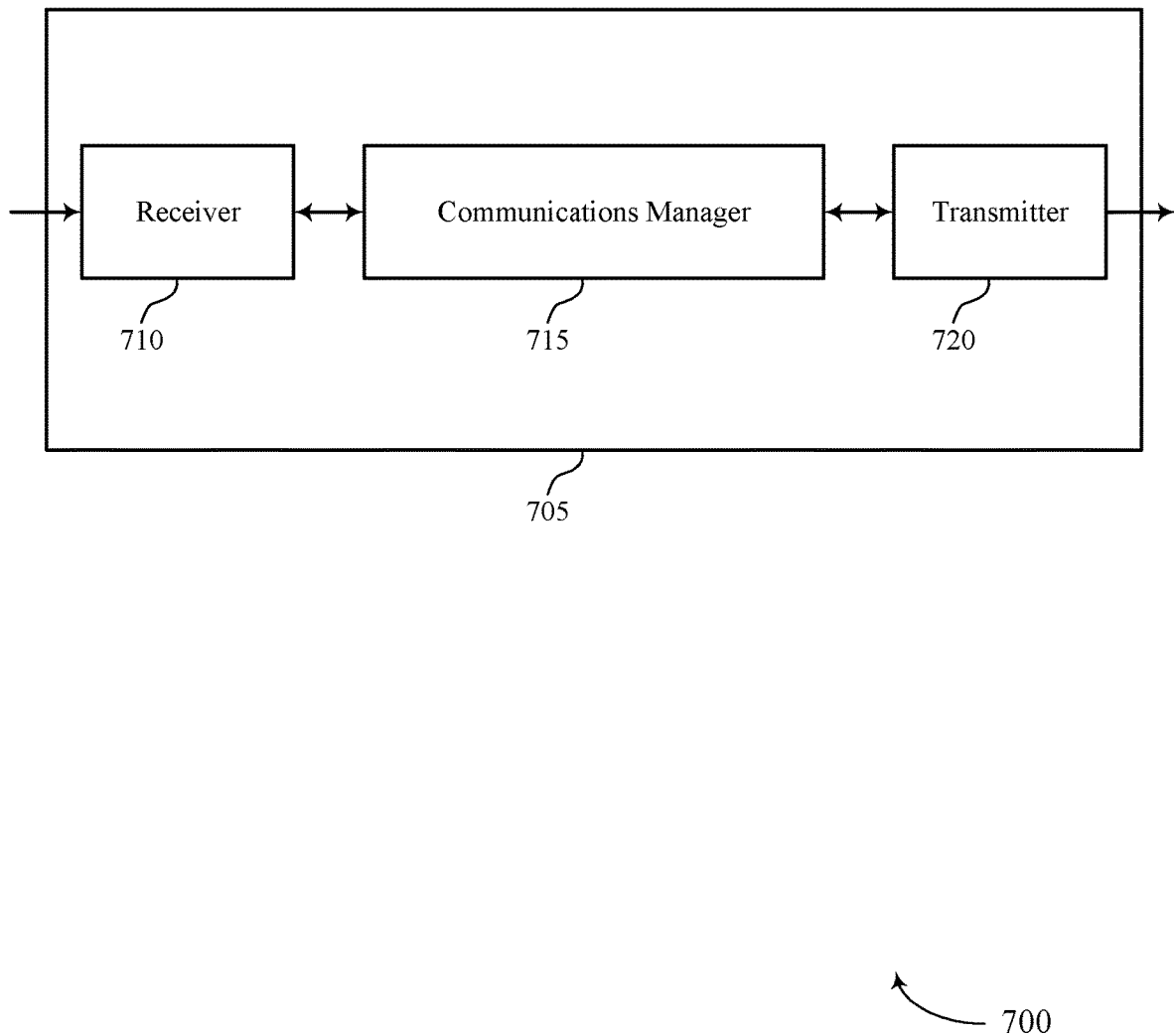
FIGS. 7 and 8 show block diagrams of devices that support interference mitigation for full-duplex communication in accordance with aspects of the present disclosure.

FIG. 7 shows a block diagram 700 of a device 705 that supports interference mitigation for full-duplex communication in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to interference mitigation for full-duplex communication, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an indication that a TTI for an uplink transmission is full-duplex, determine, for the uplink transmission, a transmission time based on the TTI being full-duplex and an arrival time for a downlink transmission of the TTI, and transmit the uplink transmission based on the transmission time.

The communications manager 715 may also receive an indication that a TTI for an uplink transmission is full-duplex, identify a cyclic prefix length for the uplink transmission, where the cyclic prefix length is based on the TTI being full-duplex and is longer than at least one cyclic prefix length available for half-duplex TTIs, and transmit the uplink transmission based on the cyclic prefix length.

The communications manager 715 may also receive an indication that a TTI for an uplink transmission is full-duplex, identify an uplink frequency band for the uplink transmission, where the uplink frequency band is separated from a downlink frequency band by a guard band that is based on the TTI being full-duplex and is larger than at least one guard band available for half-duplex TTIs, and transmit the uplink transmission in the uplink frequency band. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The actions performed by the communications manager 715 as described herein may be implemented to realize one or more potential advantages. For example, communications manager 715 may increase communication reliability and decrease interference at a UE 115 by reducing self-interference, which may reduce transmission delays, improve transmission accuracy, and reduce retransmissions. Communications manager 715 may further save power and increase battery life at a UE 115 by reducing transmission delays and retransmissions for full-duplex communications.

Figure 8:
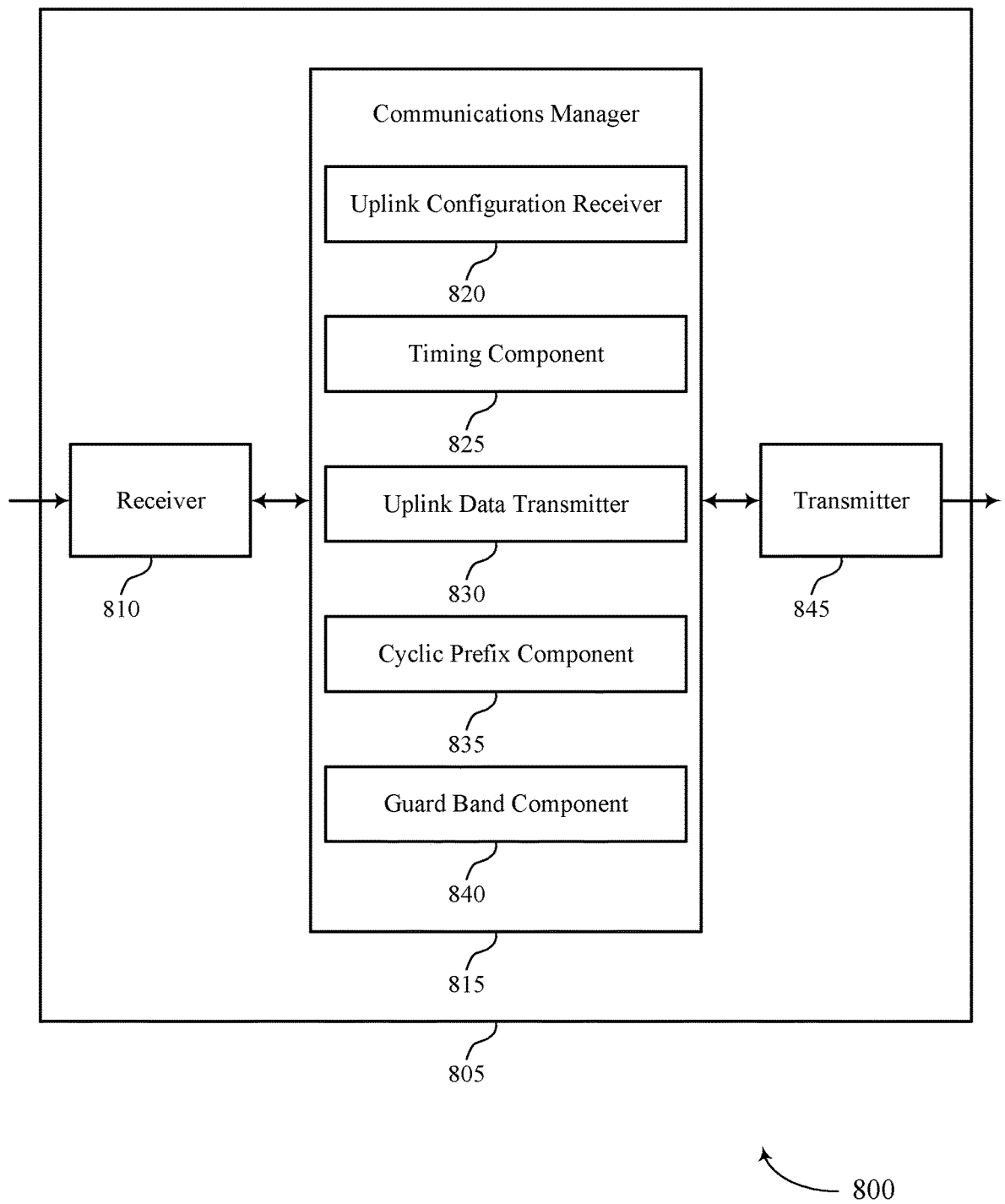

FIG. 8 shows a block diagram 800 of a device 805 that supports interference mitigation for full-duplex communication in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to interference mitigation for full-duplex communication, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an uplink configuration receiver 820, a timing component 825, an uplink data transmitter 830, a cyclic prefix component 835, and a guard band component 840. The communications manager 815 may be an example of aspects of the communications manager 1010 described herein.

The uplink configuration receiver 820 may receive an indication that a TTI for an uplink transmission is full-duplex.

The timing component 825 may determine, for the uplink transmission, a transmission time based on the TTI being full-duplex and an arrival time for a downlink transmission of the TTI.

The uplink data transmitter 830 may transmit the uplink transmission based on the transmission time.

The cyclic prefix component 835 may identify a cyclic prefix length for the uplink transmission, where the cyclic prefix length is based on the TTI being full-duplex and is longer than at least one cyclic prefix length available for half-duplex TTIs.

The uplink data transmitter 830 may transmit the uplink transmission based on the cyclic prefix length.

The guard band component 840 may identify an uplink frequency band for the uplink transmission, where the uplink frequency band is separated from a downlink frequency band by a guard band that is based on the TTI being full-duplex and is larger than at least one guard band available for half-duplex TTIs.

The uplink data transmitter 830 may transmit the uplink transmission in the uplink frequency band.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

A processor of a UE 115 (for example, controlling the receiver 810, the transmitter 845, or the transceiver 1020 as described with reference to FIG. 10) may increase communication reliability and accuracy by enabling the UE 115 to reduce self-interference at the UE 115 for full-duplex communications, which may increase reliability and reduce latency (e.g., via implementation of system components described with reference to FIG. 9). Further, the processor of the UE 115 may identify one or more aspects of a downlink transmission configuration and/or an uplink transmission configuration to perform the processes described herein. The processor of the UE 115 may identify an uplink transmission time, cyclic prefix, uplink frequency band, and/or FFT window for the UE 115, which may save power and increase battery life at the UE 115 (e.g., by reducing self-interference at the UE 115).

Figure 9:
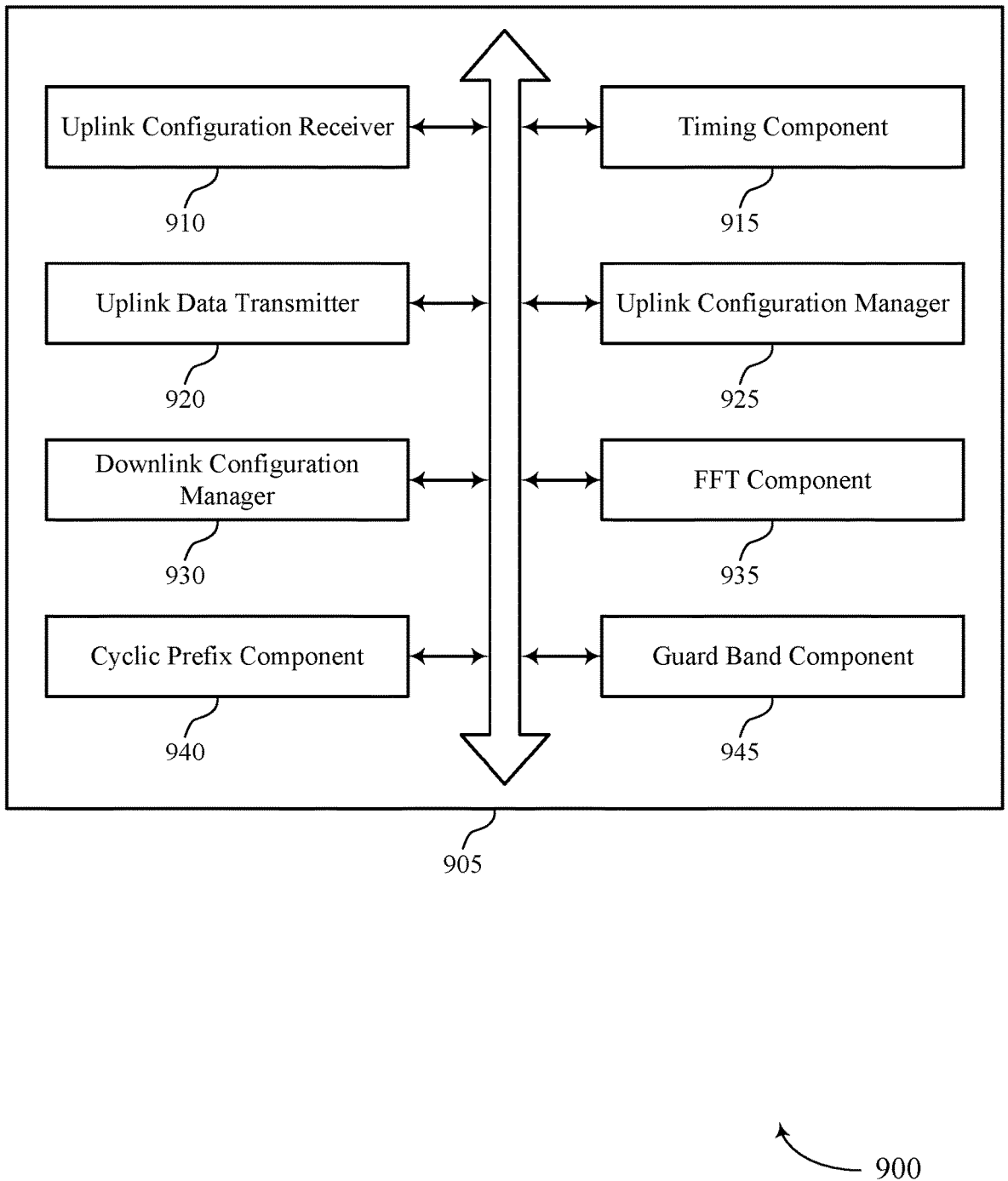
FIG. 9 shows a block diagram of a communications manager that supports interference mitigation for full-duplex communication in accordance with aspects of the present disclosure.

FIG. 9 shows a block diagram 900 of a communications manager 905 that supports interference mitigation for full-duplex communication in accordance with aspects of the present disclosure. The communications manager 905 may be an example of aspects of a communications manager 715, a communications manager 815, or a communications manager 1010 described herein. The communications manager 905 may include an uplink configuration receiver 910, a timing component 915, an uplink data transmitter 920, an uplink configuration manager 925, a downlink configuration manager 930, an FFT component 935, a cyclic prefix component 940, and a guard band component 945. Each of these modules may communicate, directly or indirectly, with one another (e.g., via one or more buses).

The uplink configuration receiver 910 may receive an indication that a TTI for an uplink transmission is full-duplex. In some examples, the uplink configuration receiver 910 may receive an indication of a first uplink timing for half-duplex TTIs and a second uplink timing for full-duplex TTIs, where a transmission time is based on the second uplink timing. In some examples, the uplink configuration receiver 910 may receive an indication of an allowable offset relative to the arrival time for the downlink transmission. In some examples, the uplink configuration receiver 910 may receive a TA command for the TTI, where a TA indicated by the TA command is specific to full-duplex TTIs. In some cases, the first uplink timing is based on a TA command and the second uplink timing is based on the arrival time for downlink transmissions. In some cases, the allowable offset is based on a cyclic prefix length for the TTI.

In some examples, the uplink configuration receiver 910 may receive a TA command for the TTI. In some examples, the uplink configuration receiver 910 may receive an indication of at least a first cyclic prefix length for half-duplex TTIs and at least a second cyclic prefix length for full-duplex TTIs, where identifying a cyclic prefix length includes identifying the second cyclic prefix length. In some examples, the uplink configuration receiver 910 may receive an indication of the cyclic prefix length, where identifying the cyclic prefix length is based on the indication.

In some examples, the uplink configuration receiver 910 may receive an indication of an uplink frequency band, where identifying the uplink frequency band is based on the indication. In some examples, the uplink configuration receiver 910 may receive an indication of a guard band, where identifying the uplink frequency band includes determining the uplink frequency band based on a downlink frequency band and the guard band.

The timing component 915 may determine, for the uplink transmission, the transmission time based on the TTI being full-duplex and an arrival time for a downlink transmission of the TTI. In some examples, the timing component 915 may determine the transmission time as equal to the arrival time for the downlink transmission. In some examples, the timing component 915 may determine the transmission time as within the allowable offset relative to the arrival time for the downlink transmission.

In some examples, the timing component 915 may ignore the TA command for the TTI based on the TTI being full-duplex. In some examples, the timing component 915 may identify an arrival time for a downlink transmission of the TTI, where transmitting the uplink transmission occurs at a time based on the arrival time for the downlink transmission. In some examples, the timing component 915 may identify an arrival time for a downlink transmission of the TTI, where transmitting the uplink transmission occurs at a time based on the arrival time for the downlink transmission.

The uplink data transmitter 920 may transmit the uplink transmission based on the transmission time. In some examples, the uplink data transmitter 920 may transmit the uplink transmission based on the cyclic prefix length. In some examples, the uplink data transmitter 920 may transmit the uplink transmission in the uplink frequency band. In some examples, the uplink data transmitter 920 may transmit an indication of a preferred guard band, where the guard band is based on the preferred guard band.

The uplink configuration manager 925 may select a beam for the uplink transmission, where the beam is included in a set of beams having different downlink timings, and where the downlink transmission is via the beam.

The downlink configuration manager 930 may monitor a CORESET. In some examples, the downlink configuration manager 930 may identify the arrival time of the downlink transmission based on a reference signal for the CORESET. In some examples, the downlink configuration manager 930 may identify a TCI state for the CORESET, where the TCI state corresponds to a quasi-co-location type for one or more reference signals of the CORESET. In some examples, the downlink configuration manager 930 may select the reference signal for identifying the arrival time of the downlink transmission based on a corresponding QCL type.

The FFT component 935 may adjust an FFT window to begin between the transmission time and the arrival time for the downlink transmission, where the FFT window is for processing one or both of the downlink transmission and the uplink transmission. In some examples, the FFT component 935 may identify a start time for the FFT window corresponding to a maximum received SINR. In some examples, the FFT component 935 may set the FFT window to have the start time.

The cyclic prefix component 940 may identify the cyclic prefix length for the uplink transmission, where the cyclic prefix length is based on the TTI being full-duplex and is longer than at least one cyclic prefix length available for half-duplex TTIs. In some examples, the cyclic prefix component 940 may select the cyclic prefix length from a set of cyclic prefix lengths that includes at least one cyclic prefix length available for full-duplex TTIs and the at least one cyclic prefix length available half-duplex TTIs. In some examples, the cyclic prefix component 940 may identify a cyclic prefix length for the uplink transmission, where the cyclic prefix length is based on the TTI being full-duplex and is longer than at least one cyclic prefix length available for half-duplex TTIs. In some cases, the cyclic prefix length is specific to full-duplex TTIs. In some cases, the cyclic prefix length is longer than all cyclic prefix lengths available for half-duplex TTIs.

The guard band component 945 may identify the uplink frequency band for the uplink transmission, where the uplink frequency band is separated from a downlink frequency band by a guard band that is based on the TTI being full-duplex and is larger than at least one guard band available for half-duplex TTIs. In some cases, the guard band is specific to full-duplex TTIs. In some cases, the guard band is larger than all guard bands available for half-duplex TTIs.

Figure 10:
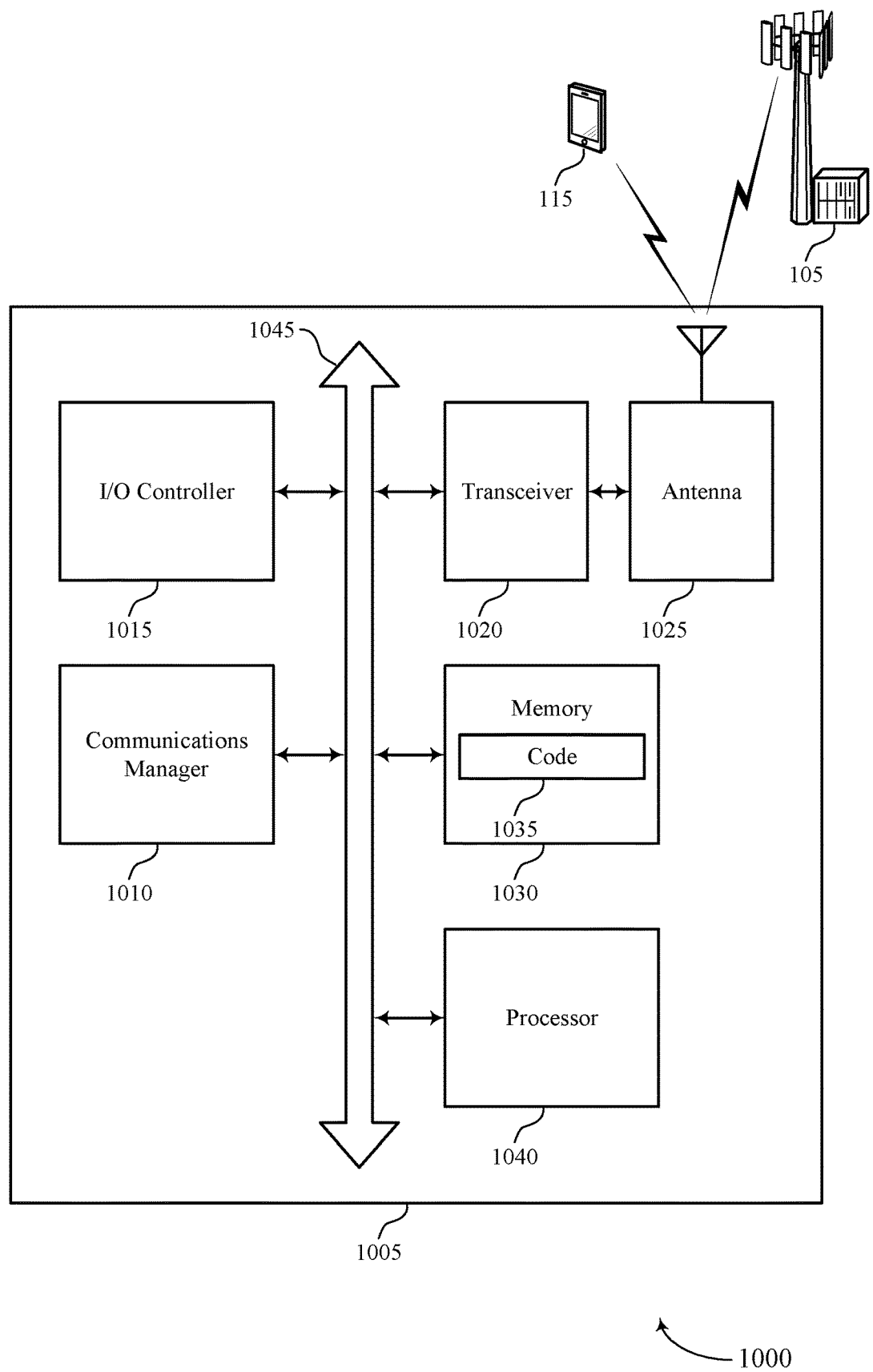
FIG. 10 shows a diagram of a system including a device that supports interference mitigation for full-duplex communication in accordance with aspects of the present disclosure.

FIG. 10 shows a diagram of a system 1000 including a device 1005 that supports interference mitigation for full-duplex communication in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive an indication that a TTI for an uplink transmission is full-duplex, determine, for the uplink transmission, a transmission time based on the TTI being full-duplex and an arrival time for a downlink transmission of the TTI, and transmit the uplink transmission based on the transmission time. The communications manager 1010 may also receive an indication that a TTI for an uplink transmission is full-duplex, identify a cyclic prefix length for the uplink transmission, where the cyclic prefix length is based on the TTI being full-duplex and is longer than at least one cyclic prefix length available for half-duplex TTIs, and transmit the uplink transmission based on the cyclic prefix length. The communications manager 1010 may also receive an indication that a TTI for an uplink transmission is full-duplex, identify an uplink frequency band for the uplink transmission, where the uplink frequency band is separated from a downlink frequency band by a guard band that is based on the TTI being full-duplex and is larger than at least one guard band available for half-duplex TTIs, and transmit the uplink transmission in the uplink frequency band.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting interference mitigation for full-duplex communication).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
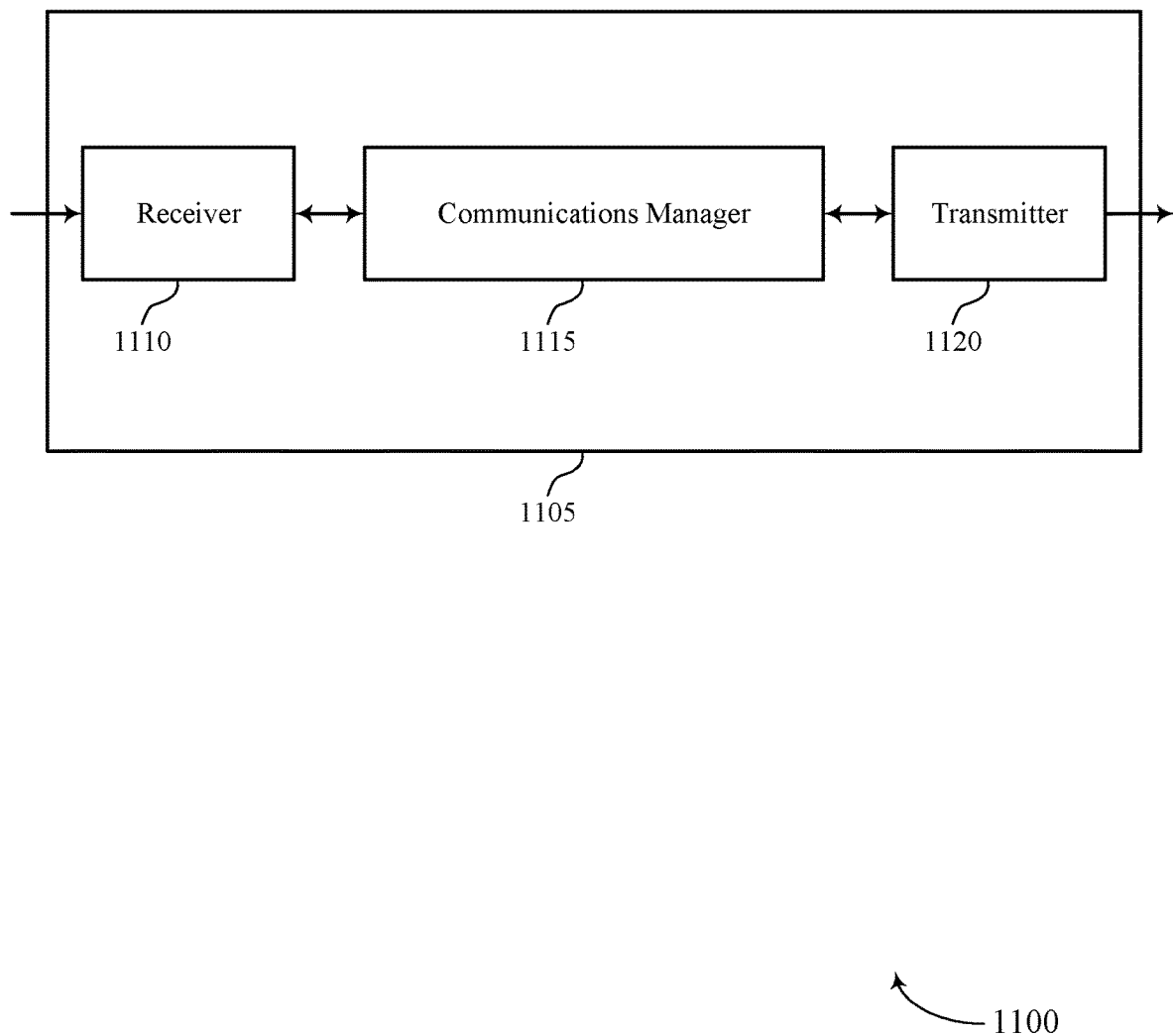
FIGS. 11 and 12 show block diagrams of devices that support interference mitigation for full-duplex communication in accordance with aspects of the present disclosure.

FIG. 11 shows a block diagram 1100 of a device 1105 that supports interference mitigation for full-duplex communication in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to interference mitigation for full-duplex communication, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit an indication that a TTI is full-duplex, transmit, to a UE, a downlink transmission for the TTI, and receive an uplink transmission for the TTI from the UE, where a timing of the uplink transmission is based on the TTI being full-duplex and an arrival time at the UE for the downlink transmission. The communications manager 1115 may also transmit, to a UE, an indication that a TTI is full-duplex, identify a cyclic prefix length for the TTI, where the cyclic prefix length is based on the TTI being full-duplex and is longer than at least one cyclic prefix length available for half-duplex TTIs, and communicate with the UE, during the TTI, based on the cyclic prefix length. The communications manager 1115 may also transmit, to a UE, an indication that a TTI for an uplink transmission is full-duplex, identify a guard band for the TTI, where the guard band is based on the TTI being full-duplex and is larger than at least one guard band available for half-duplex TTIs, and communicate with the UE, during the TTI, based on the guard band. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
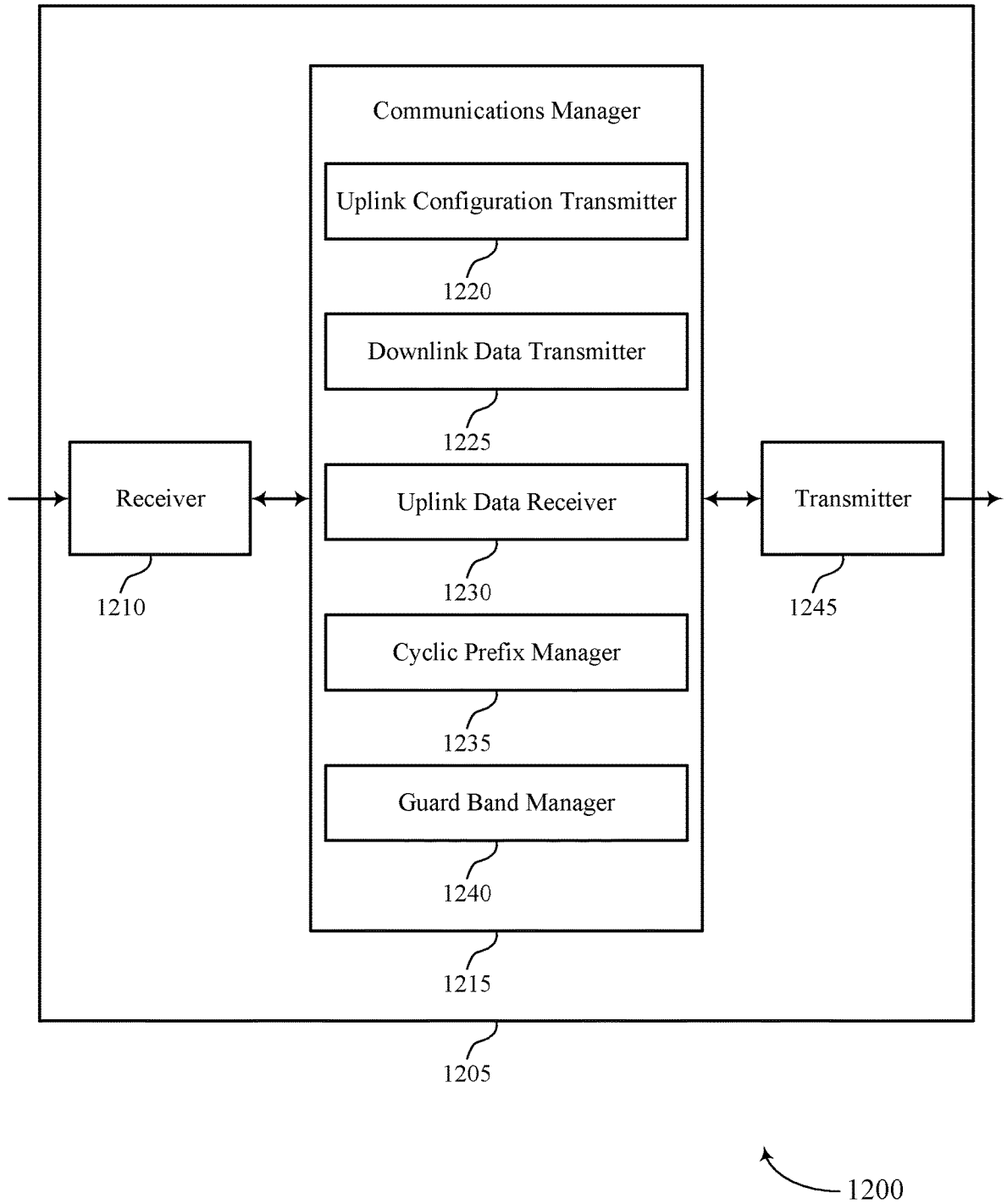

FIG. 12 shows a block diagram 1200 of a device 1205 that supports interference mitigation for full-duplex communication in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to interference mitigation for full-duplex communication, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an uplink configuration transmitter 1220, a downlink data transmitter 1225, an uplink data receiver 1230, a cyclic prefix manager 1235, and a guard band manager 1240. The communications manager 1215 may be an example of aspects of the communications manager 1410 described herein.

The uplink configuration transmitter 1220 may transmit an indication that a TTI is full-duplex.

The downlink data transmitter 1225 may transmit, to a UE, a downlink transmission for the TTI.

The uplink data receiver 1230 may receive an uplink transmission for the TTI from the UE, where a timing of the uplink transmission is based on the TTI being full-duplex and an arrival time at the UE for the downlink transmission.

The cyclic prefix manager 1235 may identify a cyclic prefix length for the TTI, where the cyclic prefix length is based on the TTI being full-duplex and is longer than at least one cyclic prefix length available for half-duplex TTIs.

The downlink data transmitter 1225 may communicate with the UE, during the TTI, based on the cyclic prefix length.

The guard band manager 1240 may identify a guard band for the TTI, where the guard band is based on the TTI being full-duplex and is larger than at least one guard band available for half-duplex TTIs.

The downlink data transmitter 1225 may communicate with the UE, during the TTI, based on the guard band.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
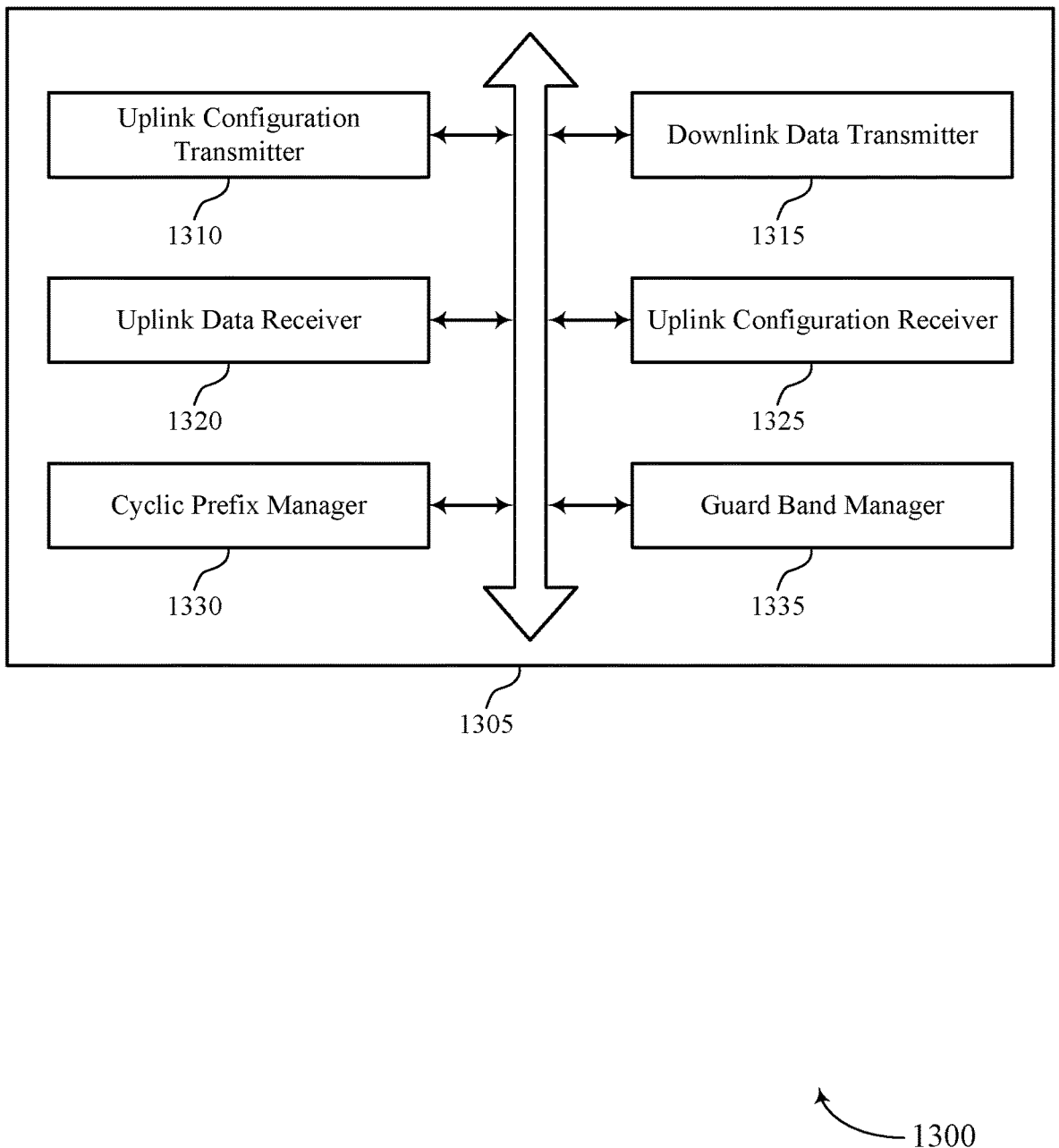
FIG. 13 shows a block diagram of a communications manager that supports interference mitigation for full-duplex communication in accordance with aspects of the present disclosure.

FIG. 13 shows a block diagram 1300 of a communications manager 1305 that supports interference mitigation for full-duplex communication in accordance with aspects of the present disclosure. The communications manager 1305 may be an example of aspects of a communications manager 1115, a communications manager 1215, or a communications manager 1410 described herein. The communications manager 1305 may include an uplink configuration transmitter 1310, a downlink data transmitter 1315, an uplink data receiver 1320, an uplink configuration receiver 1325, a cyclic prefix manager 1330, and a guard band manager 1335. Each of these modules may communicate, directly or indirectly, with one another (e.g., via one or more buses).

The uplink configuration transmitter 1310 may transmit an indication that a TTI is full-duplex. In some examples, the uplink configuration transmitter 1310 may transmit, to the UE, an indication of a first uplink timing for half-duplex TTIs and a second uplink timing for full-duplex TTIs, where a timing of an uplink transmission is based on the second uplink timing. In some examples, the uplink configuration transmitter 1310 may transmit, to the UE, an indication of an allowable offset relative to the arrival time at the UE for a downlink transmission, where the timing of the uplink transmission is based on the allowable offset. In some examples, the uplink configuration transmitter 1310 may transmit, to the UE, a TA command for the TTI, where the TA command indicates a TA that is specific to full-duplex TTIs.

In some examples, the uplink configuration transmitter 1310 may transmit, to the UE, an indication of at least a first cyclic prefix length for half-duplex TTIs and at least a second cyclic prefix length for full-duplex TTIs, where a cyclic prefix length is equal to the second cyclic prefix length. In some examples, the uplink configuration transmitter 1310 may transmit, to the UE, an indication of the cyclic prefix length, where the cyclic prefix length is based on the indication.

The downlink data transmitter 1315 may transmit, to a UE, a downlink transmission for the TTI. In some examples, the downlink data transmitter 1315 may communicate with the UE, during the TTI, based on the cyclic prefix length. In some examples, the downlink data transmitter 1315 may communicate with the UE, during the TTI, based on the guard band.

The uplink data receiver 1320 may receive an uplink transmission for the TTI from the UE, where a timing of the uplink transmission is based on the TTI being full-duplex and an arrival time at the UE for the downlink transmission. In some examples, the uplink data receiver 1320 may receive, from the UE, an indication of a preferred guard band, where identifying the guard band is based on the preferred guard band.

The uplink configuration receiver 1325 may transmit, to the UE, an indication that the UE is to transmit the uplink transmission at a time equal to the arrival time at the UE for the downlink transmission.

The cyclic prefix manager 1330 may identify a cyclic prefix length for the TTI, where the cyclic prefix length is based on the TTI being full-duplex and is longer than at least one cyclic prefix length available for half-duplex TTIs. In some examples, the cyclic prefix manager 1330 may select the cyclic prefix length from a set of cyclic prefix lengths that includes at least one cyclic prefix length associated with full-duplex TTIs and the at least one cyclic prefix length available for half-duplex TTIs.

The guard band manager 1335 may identify a guard band for the TTI, where the guard band is based on the TTI being full-duplex and is larger than at least one guard band available for half-duplex TTIs. In some examples, the guard band manager 1335 may select the guard band from a set of guard bands that includes the at least one guard band available for half-duplex TTIs and at least a second guard band available for full-duplex TTIs, where the guard band is equal to the second guard band. In some examples, the guard band manager 1335 may transmit, to the UE, an indication of the guard band or of a frequency band that is based on the guard band.

Figure 14:
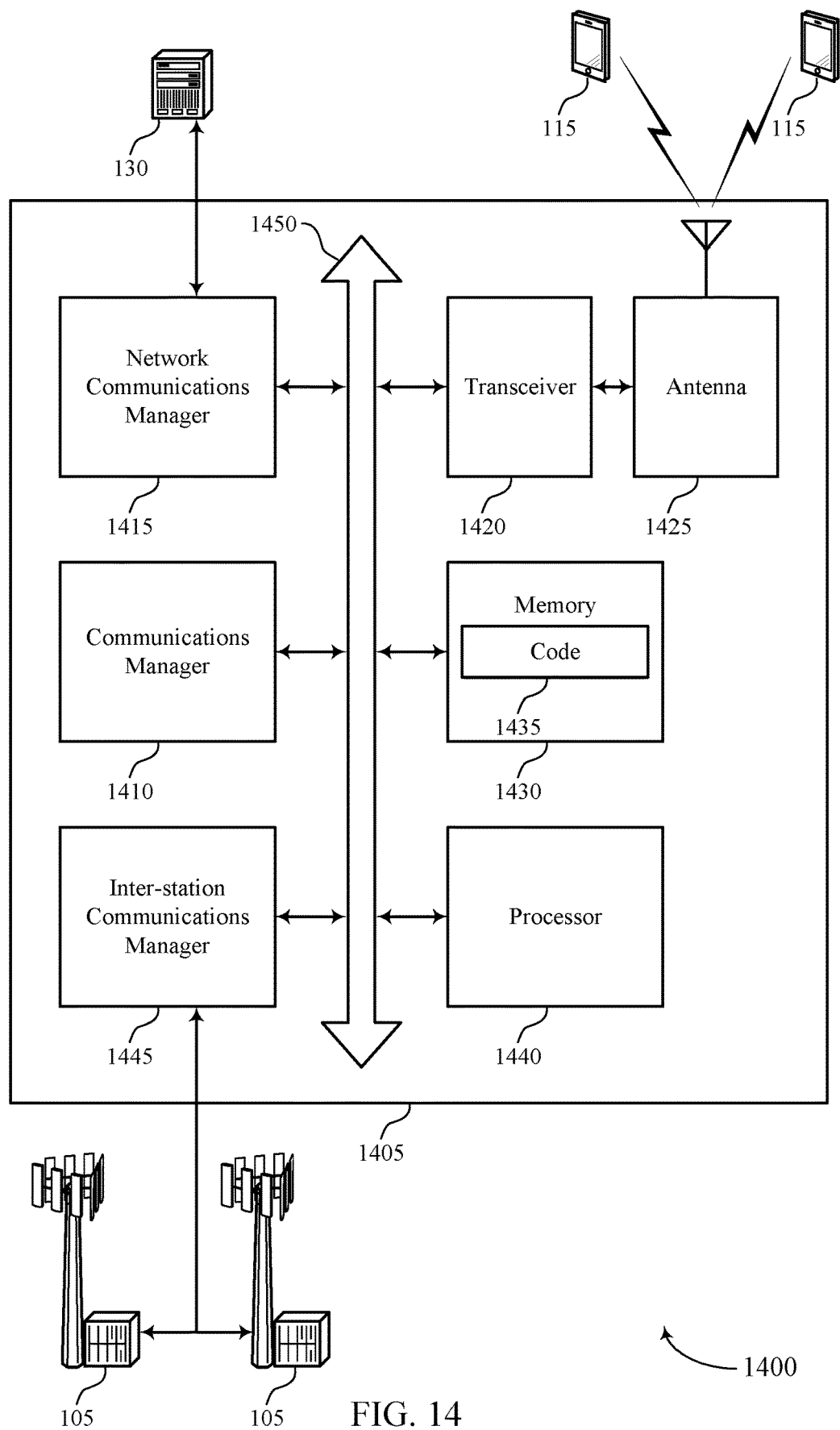
FIG. 14 shows a diagram of a system including a device that supports interference mitigation for full-duplex communication in accordance with aspects of the present disclosure.

FIG. 14 shows a diagram of a system 1400 including a device 1405 that supports interference mitigation for full-duplex communication in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit an indication that a TTI is full-duplex, transmit, to a UE, a downlink transmission for the TTI, and receive an uplink transmission for the TTI from the UE, where a timing of the uplink transmission is based on the TTI being full-duplex and an arrival time at the UE for the downlink transmission. The communications manager 1410 may also transmit, to a UE, an indication that a TTI is full-duplex, identify a cyclic prefix length for the TTI, where the cyclic prefix length is based on the TTI being full-duplex and is longer than at least one cyclic prefix length available for half-duplex TTIs, and communicate with the UE, during the TTI, based on the cyclic prefix length. The communications manager 1410 may also transmit, to a UE, an indication that a TTI for an uplink transmission is full-duplex, identify a guard band for the TTI, where the guard band is based on the TTI being full-duplex and is larger than at least one guard band available for half-duplex TTIs, and communicate with the UE, during the TTI, based on the guard band.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting interference mitigation for full-duplex communication).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
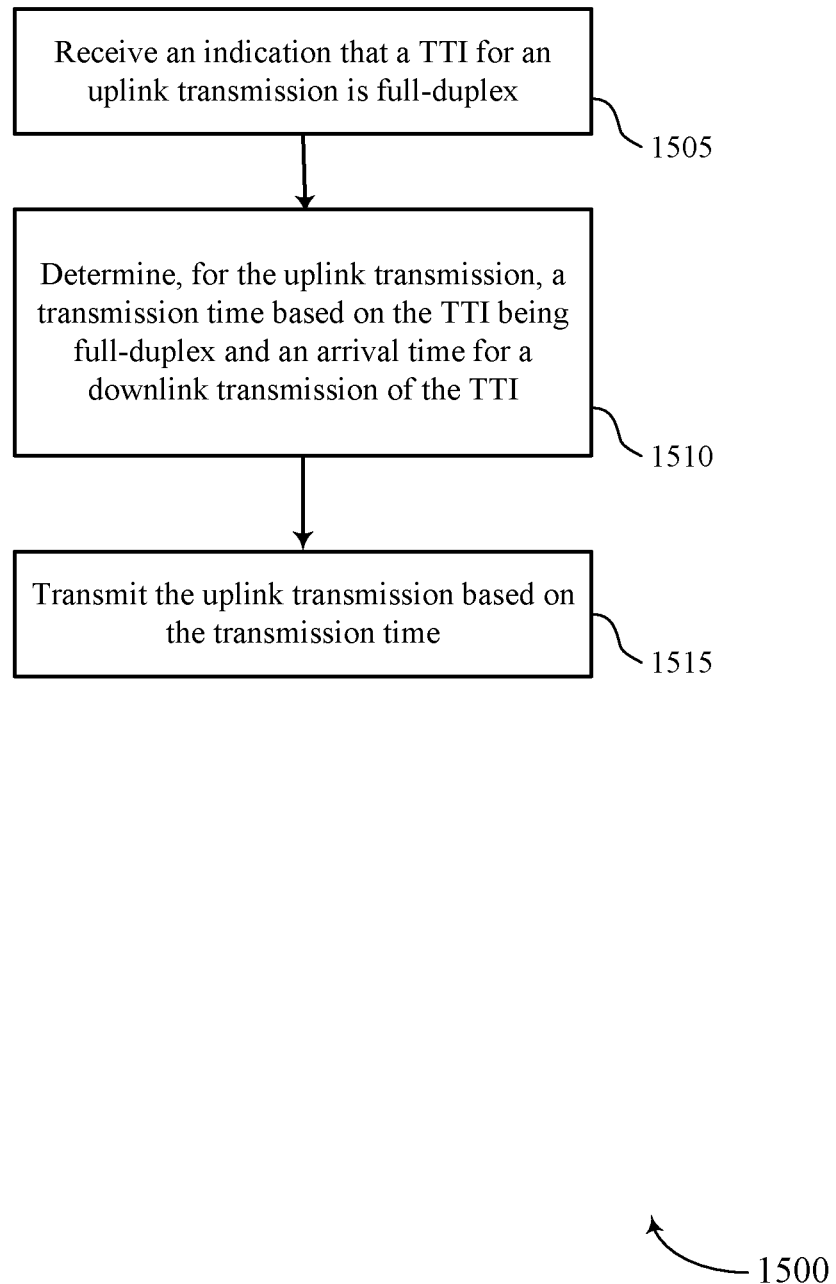
FIGS. 15 through 20 show flowcharts illustrating methods that support interference mitigation for full-duplex communication in accordance with aspects of the present disclosure.

FIG. 15 shows a flowchart illustrating a method 1500 that supports interference mitigation for full-duplex communication in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive an indication that a TTI for an uplink transmission is full-duplex. The operations of 1505 may be performed according to the methods described herein. In some examples, aspects of the operations of 1505 may be performed by an uplink configuration receiver as described with reference to FIGS. 7 through 10.

At 1510, the UE may determine, for the uplink transmission, a transmission time based on the TTI being full-duplex and an arrival time for a downlink transmission of the TTI. The operations of 1510 may be performed according to the methods described herein. In some examples, aspects of the operations of 1510 may be performed by a timing component as described with reference to FIGS. 7 through 10.

At 1515, the UE may transmit the uplink transmission based on the transmission time. The operations of 1515 may be performed according to the methods described herein. In some examples, aspects of the operations of 1515 may be performed by an uplink data transmitter as described with reference to FIGS. 7 through 10.

Figure 16:
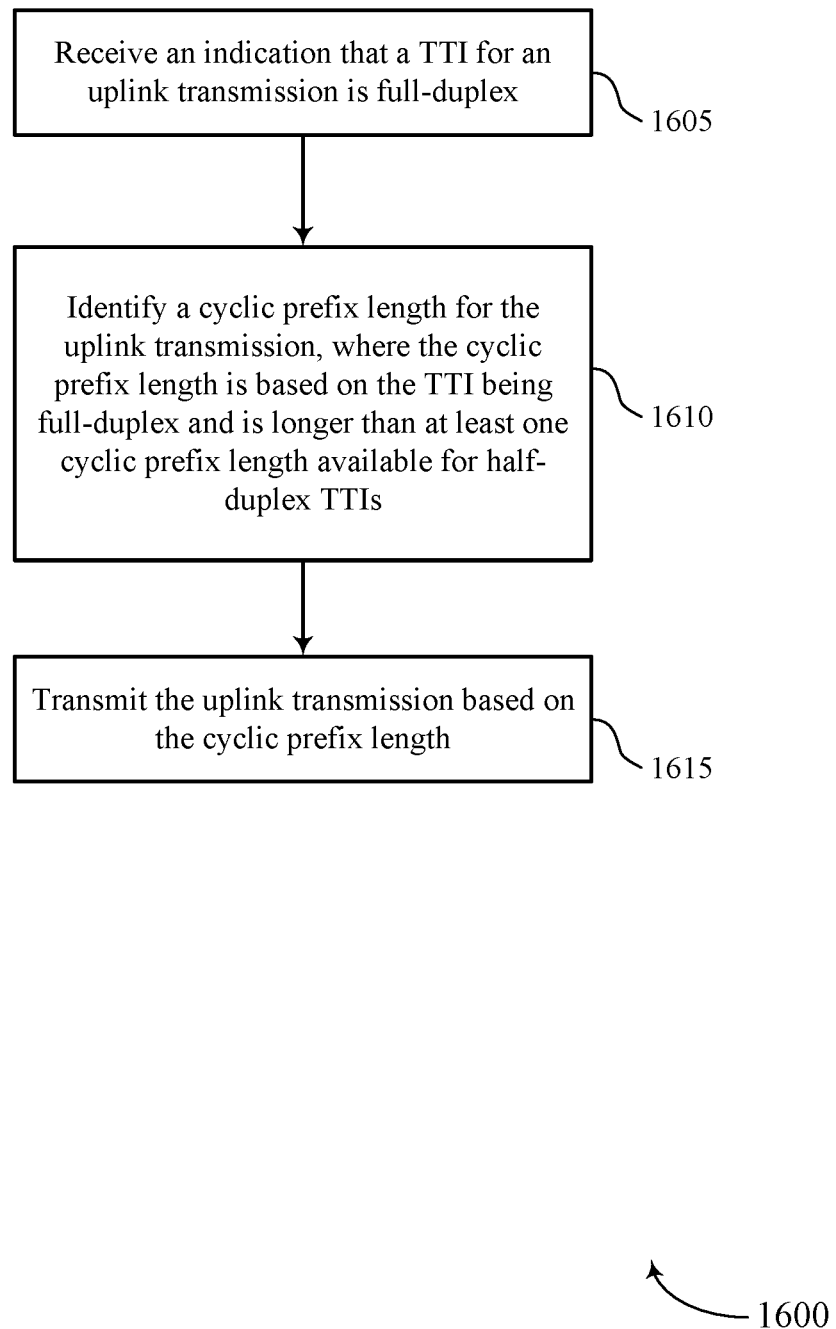

FIG. 16 shows a flowchart illustrating a method 1600 that supports interference mitigation for full-duplex communication in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive an indication that a TTI for an uplink transmission is full-duplex. The operations of 1605 may be performed according to the methods described herein. In some examples, aspects of the operations of 1605 may be performed by an uplink configuration receiver as described with reference to FIGS. 7 through 10.

At 1610, the UE may identify a cyclic prefix length for the uplink transmission, where the cyclic prefix length is based on the TTI being full-duplex and is longer than at least one cyclic prefix length available for half-duplex TTIs. The operations of 1610 may be performed according to the methods described herein. In some examples, aspects of the operations of 1610 may be performed by a cyclic prefix component as described with reference to FIGS. 7 through 10.

At 1615, the UE may transmit the uplink transmission based on the cyclic prefix length. The operations of 1615 may be performed according to the methods described herein. In some examples, aspects of the operations of 1615 may be performed by an uplink data transmitter as described with reference to FIGS. 7 through 10.

Figure 17:
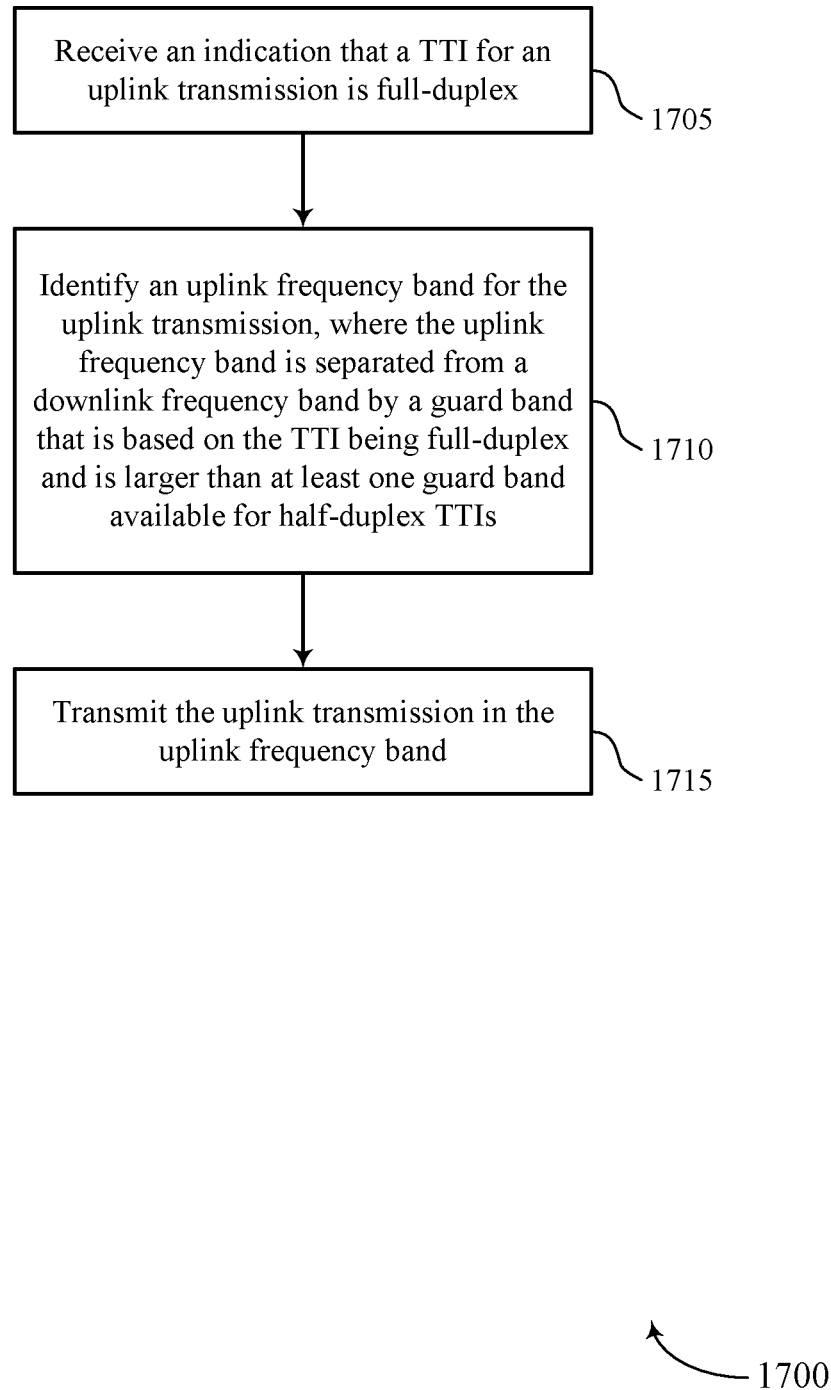

FIG. 17 shows a flowchart illustrating a method 1700 that supports interference mitigation for full-duplex communication in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive an indication that a TTI for an uplink transmission is full-duplex. The operations of 1705 may be performed according to the methods described herein. In some examples, aspects of the operations of 1705 may be performed by an uplink configuration receiver as described with reference to FIGS. 7 through 10.

At 1710, the UE may identify an uplink frequency band for the uplink transmission, where the uplink frequency band is separated from a downlink frequency band by a guard band that is based on the TTI being full-duplex and is larger than at least one guard band available for half-duplex TTIs. The operations of 1710 may be performed according to the methods described herein. In some examples, aspects of the operations of 1710 may be performed by a guard band component as described with reference to FIGS. 7 through 10.

At 1715, the UE may transmit the uplink transmission in the uplink frequency band. The operations of 1715 may be performed according to the methods described herein. In some examples, aspects of the operations of 1715 may be performed by an uplink data transmitter as described with reference to FIGS. 7 through 10.

Figure 18:
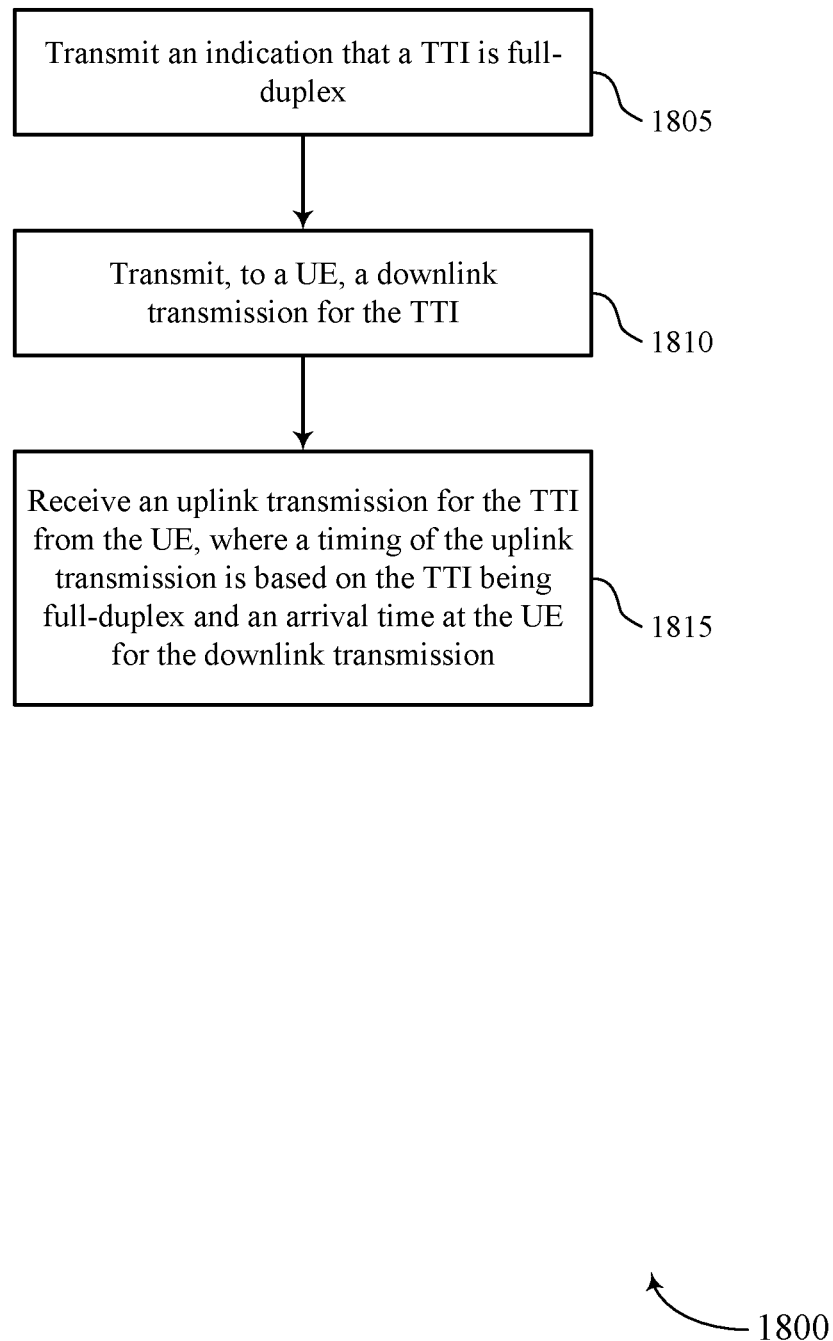

FIG. 18 shows a flowchart illustrating a method 1800 that supports interference mitigation for full-duplex communication in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit an indication that a TTI is full-duplex. The operations of 1805 may be performed according to the methods described herein. In some examples, aspects of the operations of 1805 may be performed by an uplink configuration transmitter as described with reference to FIGS. 11 through 14.

At 1810, the base station may transmit, to a UE, a downlink transmission for the TTI. The operations of 1810 may be performed according to the methods described herein. In some examples, aspects of the operations of 1810 may be performed by a downlink data transmitter as described with reference to FIGS. 11 through 14.

At 1815, the base station may receive an uplink transmission for the TTI from the UE, where a timing of the uplink transmission is based on the TTI being full-duplex and an arrival time at the UE for the downlink transmission. The operations of 1815 may be performed according to the methods described herein. In some examples, aspects of the operations of 1815 may be performed by an uplink data receiver as described with reference to FIGS. 11 through 14.

Figure 19:
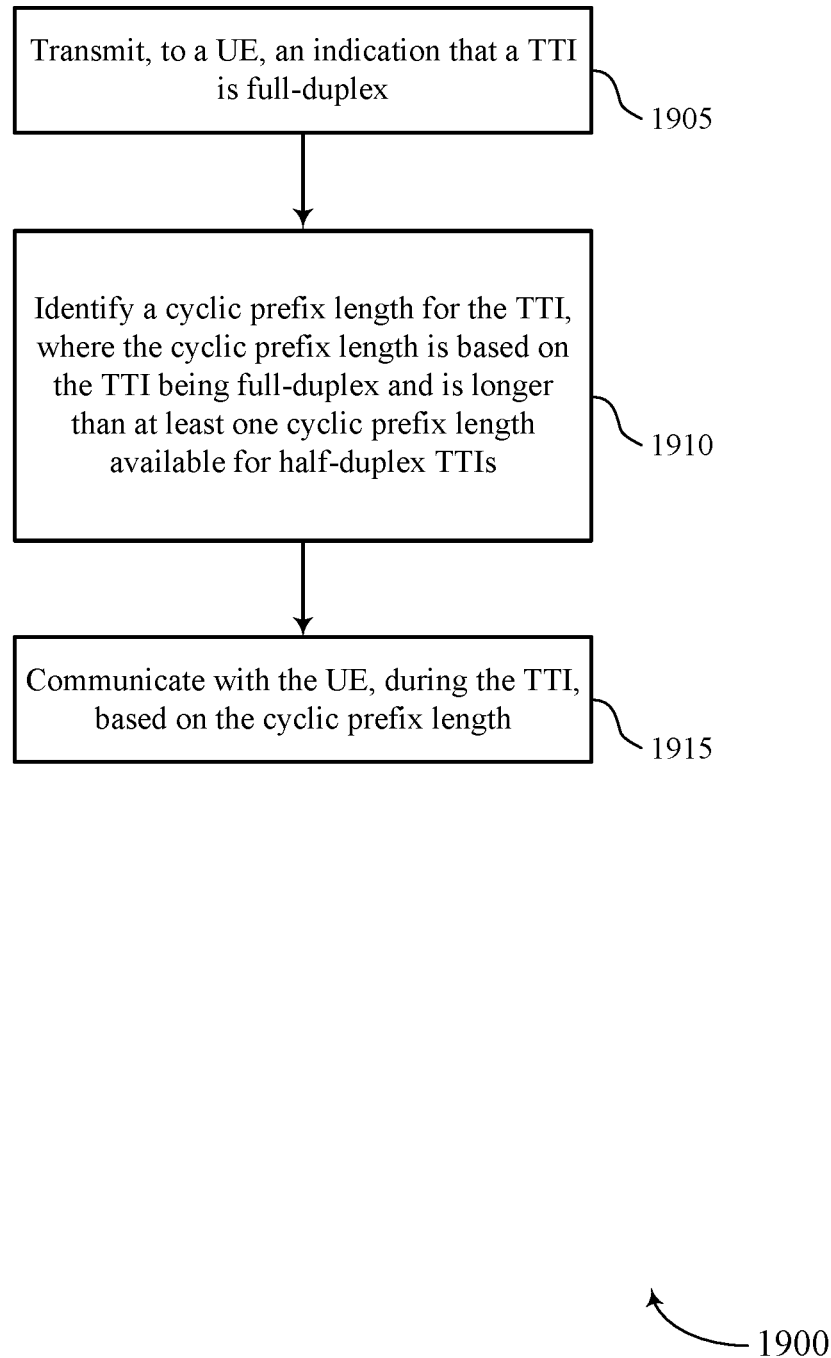

FIG. 19 shows a flowchart illustrating a method 1900 that supports interference mitigation for full-duplex communication in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, an indication that a TTI is full-duplex. The operations of 1905 may be performed according to the methods described herein. In some examples, aspects of the operations of 1905 may be performed by an uplink configuration transmitter as described with reference to FIGS. 11 through 14.

At 1910, the base station may identify a cyclic prefix length for the TTI, where the cyclic prefix length is based on the TTI being full-duplex and is longer than at least one cyclic prefix length available for half-duplex TTIs. The operations of 1910 may be performed according to the methods described herein. In some examples, aspects of the operations of 1910 may be performed by a cyclic prefix manager as described with reference to FIGS. 11 through 14.

At 1915, the base station may communicate with the UE, during the TTI, based on the cyclic prefix length. The operations of 1915 may be performed according to the methods described herein. In some examples, aspects of the operations of 1915 may be performed by a downlink data transmitter as described with reference to FIGS. 11 through 14.

Figure 20:
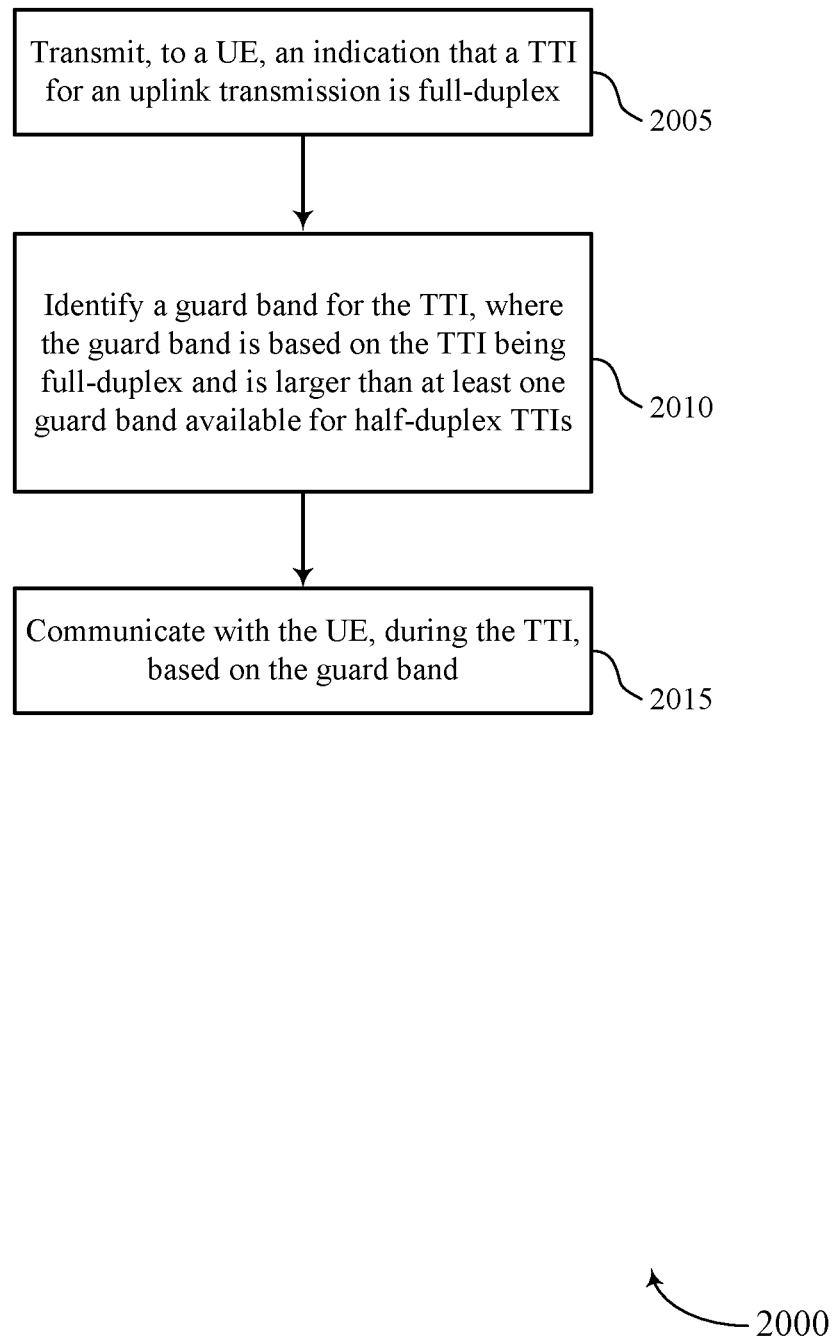

FIG. 20 shows a flowchart illustrating a method 2000 that supports interference mitigation for full-duplex communication in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an indication that a TTI for an uplink transmission is full-duplex. The operations of 2005 may be performed according to the methods described herein. In some examples, aspects of the operations of 2005 may be performed by an uplink configuration transmitter as described with reference to FIGS. 11 through 14.

At 2010, the base station may identify a guard band for the TTI, where the guard band is based on the TTI being full-duplex and is larger than at least one guard band available for half-duplex TTIs. The operations of 2010 may be performed according to the methods described herein. In some examples, aspects of the operations of 2010 may be performed by a guard band manager as described with reference to FIGS. 11 through 14.

At 2015, the base station may communicate with the UE, during the TTI, based on the guard band. The operations of 2015 may be performed according to the methods described herein. In some examples, aspects of the operations of 2015 may be performed by a downlink data transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving an indication that a transmission time interval (TTI) for an uplink transmission is full-duplex;
monitoring a control resource set (CORESET);
determining a transmission time for the uplink transmission based at least in part on an arrival time for a downlink transmission of the TTI, wherein determining the transmission time for the uplink transmission is based at least in part on a self-interference associated with a partial overlap in time between the uplink transmission and the downlink transmission, and wherein the arrival time of the downlink transmission is identified based at least in part on a reference signal for the CORESET; and
transmitting the uplink transmission based at least in part on the transmission time.

2. The method of claim 1, further comprising:
receiving an indication of a first uplink timing for half-duplex TTIs and a second uplink timing for full-duplex TTIs, wherein the transmission time is based at least in part on the second uplink timing.

3. The method of claim 2, wherein the first uplink timing is based at least in part on a timing advance (TA) command and the second uplink timing is based at least in part on the arrival time for downlink transmissions.

4. The method of claim 1, wherein determining the transmission time comprises:
determining the transmission time as equal to the arrival time for the downlink transmission.

5. The method of claim 1, wherein determining the transmission time comprises:
receiving an indication of an allowable offset relative to the arrival time for the downlink transmission; and
determining the transmission time as within the allowable offset relative to the arrival time for the downlink transmission.

6. The method of claim 5, wherein the allowable offset is based at least in part on a cyclic prefix length for the TTI.

7. The method of claim 1, further comprising:
receiving a timing advance (TA) command for the TTI, wherein a timing advance indicated by the TA command is specific to full-duplex TTIs.

8. The method of claim 1, further comprising:
receiving a timing advance (TA) command for the TTI; and
ignoring the TA command for the TTI based at least in part on the TTI being full-duplex.

9. The method of claim 1, further comprising:
selecting a beam for the uplink transmission, wherein the beam is included in a plurality of beams having different downlink timings, and wherein the downlink transmission is via the beam.

10. The method of claim 1, further comprising:
identifying a transmission configuration indicator (TCI) state for the CORESET, wherein the TCI state corresponds to a quasi-co-location (QCL) type for one or more reference signals of the CORESET; and
selecting the reference signal for identifying the arrival time of the downlink transmission based at least in part on a corresponding QCL type.

11. The method of claim 1, further comprising:
adjusting a fast Fourier transform (FFT) window to begin between the transmission time and the arrival time for the downlink transmission, wherein the FFT window is for processing one or both of the downlink transmission and the uplink transmission.

12. The method of claim 11, wherein adjusting the FFT window comprises:
identifying a start time for the FFT window corresponding to a maximum received signal-to-interference-plus-noise ratio (SINR); and
setting the FFT window to have the start time.

13. The method of claim 1, further comprising:
identifying a cyclic prefix length for the uplink transmission, wherein the cyclic prefix length is based at least in part on the TTI being full-duplex and is longer than at least one cyclic prefix length available for half-duplex TTIs.

14. The method of claim 1, further comprising:
identifying an uplink frequency band for the uplink transmission, wherein the uplink frequency band is separated from a downlink frequency band by a guard band that is based at least in part on the TTI being full-duplex and is larger than at least one guard band available for half-duplex TTIs.

15. A method for wireless communication, comprising:
receiving an indication that a transmission time interval (TTI) for an uplink transmission is full-duplex;
identifying a cyclic prefix length for the uplink transmission, wherein the cyclic prefix length is based at least in part on the TTI being full-duplex and is longer than at least one cyclic prefix length available for half-duplex TTIs; and
transmitting the uplink transmission based at least in part on the cyclic prefix length.

16. The method of claim 15, further comprising:
receiving an indication of at least a first cyclic prefix length for half-duplex TTIs and at least a second cyclic prefix length for full-duplex TTIs, wherein identifying the cyclic prefix length comprises identifying the second cyclic prefix length.

17. The method of claim 15, further comprising:
receiving an indication of the cyclic prefix length, wherein identifying the cyclic prefix length is based at least in part on the indication.

18. The method of claim 15, wherein identifying the cyclic prefix length comprises:
selecting the cyclic prefix length from a set of cyclic prefix lengths that includes at least one cyclic prefix length available for full-duplex TTIs and the at least one cyclic prefix length available for half-duplex TTIs.

19. The method of claim 15, wherein the cyclic prefix length is specific to full-duplex TTIs.

20. The method of claim 15, wherein the cyclic prefix length is longer than all cyclic prefix lengths available for half-duplex TTIs.

21. The method of claim 15, further comprising:
identifying an arrival time for a downlink transmission of the TTI, wherein transmitting the uplink transmission occurs at a time based at least in part on the arrival time for the downlink transmission.

22. The method of claim 15, further comprising:
identifying an uplink frequency band for the uplink transmission, wherein the uplink frequency band is separated from a downlink frequency band by a guard band that is based at least in part on the TTI being full-duplex and is larger than at least one guard band available for half-duplex TTIs.

23. A method for wireless communication, comprising:
receiving an indication that a transmission time interval (TTI) for an uplink transmission is full-duplex;
identifying an uplink frequency band for the uplink transmission, wherein the uplink frequency band is separated from a downlink frequency band by a guard band that is based at least in part on the TTI being full-duplex and is larger than at least one guard band available for half-duplex TTIs; and
transmitting the uplink transmission in the uplink frequency band.

24. The method of claim 23, further comprising:
transmitting an indication of a preferred guard band, wherein the guard band is based at least in part on the preferred guard band.

25. The method of claim 23, further comprising:
receiving an indication of the uplink frequency band, wherein identifying the uplink frequency band is based at least in part on the indication.

26. The method of claim 23, further comprising:
receiving an indication of the guard band, wherein identifying the uplink frequency band comprises determining the uplink frequency band based at least in part on the downlink frequency band and the guard band.

27. The method of claim 23, wherein the guard band is specific to full-duplex TTIs.

28. The method of claim 23, wherein the guard band is larger than all guard bands available for half-duplex TTIs.

29. The method of claim 23, further comprising:
identifying an arrival time for a downlink transmission of the TTI, wherein transmitting the uplink transmission occurs at a time based at least in part on the arrival time for the downlink transmission.

30. The method of claim 23, further comprising:
identifying a cyclic prefix length for the uplink transmission, wherein the cyclic prefix length is based at least in part on the TTI being full-duplex and is longer than at least one cyclic prefix length available for half-duplex TTIs.

31. A method for wireless communication, comprising:
transmitting, to a user equipment (UE), an indication that a transmission time interval (TTI) is full-duplex;
identifying a cyclic prefix length for the TTI, wherein the cyclic prefix length is based at least in part on the TTI being full-duplex and is longer than at least one cyclic prefix length available for half-duplex TTIs; and
communicating with the UE, during the TTI, based at least in part on the cyclic prefix length.

32. The method of claim 31, further comprising:
transmitting, to the UE, an indication of at least a first cyclic prefix length for half-duplex TTIs and at least a second cyclic prefix length for full-duplex TTIs, wherein the cyclic prefix length is equal to the second cyclic prefix length.

33. The method of claim 31, further comprising:
transmitting, to the UE, an indication of the cyclic prefix length, wherein the cyclic prefix length is based at least in part on the indication.

34. The method of claim 31, wherein identifying the cyclic prefix length comprises:
selecting the cyclic prefix length from a set of cyclic prefix lengths that includes at least one cyclic prefix length associated with full-duplex TTIs and the at least one cyclic prefix length available for half-duplex TTIs.

35. An apparatus for wireless communication, comprising:
a processor,
memory in electronic communication with the processor; and
instructions stored in the memory and executable by the processor to cause the apparatus to:
receive an indication that a transmission time interval (TTI) for an uplink transmission is full-duplex;
monitor a control resource set (CORESET);
determine a transmission time for the uplink transmission based at least in part on an arrival time for a downlink transmission of the TTI, wherein determining the transmission time for the uplink transmission is based at least in part on a self-interference associated with a partial overlap in time between the uplink transmission and the downlink transmission, and wherein the instructions are executable by the processor to cause the apparatus to identify the arrival time of the downlink transmission based at least in part on a reference signal for the CORESET; and
transmit the uplink transmission based at least in part on the transmission time.

36. The apparatus of claim 35, wherein the instructions are further executable by the processor to cause the apparatus to:
receive an indication of a first uplink timing for half-duplex TTIs and a second uplink timing for full-duplex TTIs, wherein the transmission time is based at least in part on the second uplink timing.

37. The apparatus of claim 36, wherein the first uplink timing is based at least in part on a timing advance (TA) command and the second uplink timing is based at least in part on the arrival time for downlink transmissions.

38. The apparatus of claim 35, wherein the instructions to determine the transmission time are executable by the processor to cause the apparatus to:
determine the transmission time as equal to the arrival time for the downlink transmission.

39. The apparatus of claim 35, wherein the instructions to determine the transmission time are executable by the processor to cause the apparatus to:
receive an indication of an allowable offset relative to the arrival time for the downlink transmission; and determine the transmission time as within the allowable offset relative to the arrival time for the downlink transmission.

40. An apparatus for wireless communication, comprising:
a processor,
memory in electronic communication with the processor; and
instructions stored in the memory and executable by the processor to cause the apparatus to:
receive an indication that a transmission time interval (TTI) for an uplink transmission is full-duplex;
identify a cyclic prefix length for the uplink transmission, wherein the cyclic prefix length is based at least in part on the TTI being full-duplex and is longer than at least one cyclic prefix length available for half-duplex TTIs; and
transmit the uplink transmission based at least in part on the cyclic prefix length.

41. The apparatus of claim 40, wherein the instructions are further executable by the processor to cause the apparatus to:
receive an indication of at least a first cyclic prefix length for half-duplex TTIs and at least a second cyclic prefix length for full-duplex TTIs, wherein identifying the cyclic prefix length comprises identifying the second cyclic prefix length.

42. The apparatus of claim 40, wherein the instructions are further executable by the processor to cause the apparatus to:
receive an indication of the cyclic prefix length, wherein identifying the cyclic prefix length is based at least in part on the indication.

43. The apparatus of claim 40, wherein the instructions to identify the cyclic prefix length are executable by the processor to cause the apparatus to:
select the cyclic prefix length from a set of cyclic prefix lengths that includes at least one cyclic prefix length available for full-duplex TTIs and the at least one cyclic prefix length available for half-duplex TTIs.

44. The apparatus of claim 40, wherein the cyclic prefix length is specific to full-duplex TTIs.

45. The apparatus of claim 40, wherein the cyclic prefix length is longer than all cyclic prefix lengths available for half-duplex TTIs.

46. An apparatus for wireless communication, comprising:
a processor,
memory in electronic communication with the processor; and
instructions stored in the memory and executable by the processor to cause the apparatus to:
receive an indication that a transmission time interval (TTI) for an uplink transmission is full-duplex;
identify an uplink frequency band for the uplink transmission, wherein the uplink frequency band is separated from a downlink frequency band by a guard band that is based at least in part on the TTI being full-duplex and is larger than at least one guard band available for half-duplex TTIs; and
transmit the uplink transmission in the uplink frequency band.

47. The apparatus of claim 46, wherein the instructions are further executable by the processor to cause the apparatus to:
transmit an indication of a preferred guard band, wherein the guard band is based at least in part on the preferred guard band.

48. The apparatus of claim 46, wherein the guard band is specific to full-duplex TTIs.

49. The apparatus of claim 46, wherein the guard band is larger than all guard bands available for half-duplex TTIs.

50. An apparatus for wireless communication, comprising:
a processor,
memory in electronic communication with the processor; and
instructions stored in the memory and executable by the processor to cause the apparatus to:
transmit, to a user equipment (UE), an indication that a transmission time interval (TTI) is full-duplex;
identify a cyclic prefix length for the TTI, wherein the cyclic prefix length is based at least in part on the TTI being full-duplex and is longer than at least one cyclic prefix length available for half-duplex TTIs; and
communicate with the UE, during the TTI, based at least in part on the cyclic prefix length.

51. The apparatus of claim 50, wherein the instructions are further executable by the processor to cause the apparatus to:
transmit, to the UE, an indication of at least a first cyclic prefix length for half-duplex TTIs and at least a second cyclic prefix length for full-duplex TTIs, wherein the cyclic prefix length is equal to the second cyclic prefix length.

52. The apparatus of claim 50, wherein the instructions are further executable by the processor to cause the apparatus to:
transmit, to the UE, an indication of the cyclic prefix length, wherein the cyclic prefix length is based at least in part on the indication.

53. The apparatus of claim 50, wherein the instructions to identify the cyclic prefix length are executable by the processor to cause the apparatus to:
select the cyclic prefix length from a set of cyclic prefix lengths that includes at least one cyclic prefix length associated with full-duplex TTIs and the at least one cyclic prefix length available for half-duplex TTIs.

* * * * *